United States Patent
Nagashima et al.

(10) Patent No.: US 9,903,987 B2
(45) Date of Patent: Feb. 27, 2018

(54) LASER OPTICAL DEVICE AND IMAGE PROJECTION DEVICE

(71) Applicant: Funai Electric Co., Ltd., Osaka (JP)

(72) Inventors: Kenji Nagashima, Takatsuki (JP); Toyoshi Nogami, Muntinlupa (PH); Tatsuya Ito, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 15/508,827

(22) PCT Filed: Sep. 7, 2015

(86) PCT No.: PCT/JP2015/004538
§ 371 (c)(1),
(2) Date: Mar. 3, 2017

(87) PCT Pub. No.: WO2016/035349
PCT Pub. Date: Mar. 10, 2016

(65) Prior Publication Data
US 2017/0269269 A1    Sep. 21, 2017

(30) Foreign Application Priority Data

Sep. 5, 2014 (JP) .................................. 2014-181549
Sep. 5, 2014 (JP) .................................. 2014-181574

(51) Int. Cl.
*H04N 9/31* (2006.01)
*G02B 5/18* (2006.01)
(Continued)

(52) U.S. Cl.
CPC ........... *G02B 5/1861* (2013.01); *G02B 26/10* (2013.01); *G02B 27/30* (2013.01); *H04N 9/312* (2013.01);
(Continued)

(58) Field of Classification Search
CPC .... H04N 9/312; H04N 9/3129; H04N 9/3155; H04N 9/3161; H04N 9/3164; H04N 9/31; G02B 5/1861; G02B 26/10; G02B 27/30
(Continued)

(56) References Cited

U.S. PATENT DOCUMENTS

2008/0197286 A1    8/2008  Kasai
2011/0141441 A1*   6/2011  Konno ............... G02B 26/0841
                                              353/69
(Continued)

FOREIGN PATENT DOCUMENTS

JP    2001-255491 A    9/2001
JP    2001-290017 A    10/2001
(Continued)

OTHER PUBLICATIONS

International Search Report issued in PCT/JP2015/004538, dated Nov. 24, 2015 (2 pages).
(Continued)

*Primary Examiner* — Sherrie Hsia
(74) *Attorney, Agent, or Firm* — Osha Liang LLP

(57) ABSTRACT

A laser optical device is provided with a plurality of laser light sources, a collimating lens that has an optical axis that intersects a line connecting the plurality of laser light sources in a plan view viewed from a direction perpendicular to both this line and the optical axis and collimates lights respectively emitted from the plurality of laser light sources, and a deflecting element that deflects a plurality of lights emitted from the collimating lens so output lights where the lights respectively emitted from the plurality of laser light sources are optically processed make contact.

20 Claims, 33 Drawing Sheets

(51) Int. Cl.
    *G02B 26/10*    (2006.01)
    *G02B 27/30*    (2006.01)
(52) U.S. Cl.
    CPC ......... *H04N 9/3129* (2013.01); *H04N 9/3155* (2013.01); *H04N 9/3161* (2013.01); *H04N 9/3164* (2013.01)
(58) Field of Classification Search
    USPC .................. 348/760, 759, 744, 804; 353/34; 359/641, 642
    See application file for complete search history.

(56)    References Cited

U.S. PATENT DOCUMENTS

2012/0242830 A1*  9/2012  Kumagai ............. G01C 15/004
                                                         348/135
2015/0316234 A1   11/2015  Samonji et al.

FOREIGN PATENT DOCUMENTS

| JP | 2007-047245 A | 2/2007 |
| WO | 91/02954 A1 | 3/1991 |
| WO | 2014/115194 A1 | 7/2014 |

OTHER PUBLICATIONS

Written Opinion of the International Searching Authority issued in PCT/JP2015/004538, dated Nov. 24, 2015 (6 pages).
Extended European Search Report in counterpart European Application No. 15 838 619.3 dated Nov. 13, 2017 (9 pages).

* cited by examiner

Optimal blade shape at wavelength of 630 nm　　Optimal blade shape at wavelength of 640 nm　　Optimal blade shape at wavelength of 650 nm

LASER OPTICAL DEVICE AND IMAGE PROJECTION DEVICE

TECHNICAL FIELD

The present invention relates to a laser optical device and a projector and a head-up display provided therewith.

BACKGROUND ART

With a conventional projector of a laser-scanning type, there is a situation where the laser optical device illustrated in FIG. 13 is used to compensate for a brightness on a screen being deficient. The conventional laser optical device illustrated in FIG. 13 is provided with semiconductor laser elements 101 and 102, a polarizing prism 103, and a collimating lens 104.

The semiconductor laser elements 101 and 102 emit laser lights of identical wavelengths. However, the semiconductor laser element 101 is a laser element that outputs a p-polarized light, and the semiconductor laser element 102 is a laser element that outputs an s-polarized light.

The polarizing prism 103 has a polarizing surface 103A that transmits a p-polarized light and reflects an s-polarized light. By the laser light emitted from the semiconductor laser element 101 (p-polarized light) being transmitted through the polarizing surface 103A and the laser light emitted from the semiconductor laser element 102 (s-polarized light) being reflected at the polarizing surface 103A, both laser lights become incident to the collimating lens 104 as one laser light.

The collimating lens 104 converts the incident light into a parallel light. The parallel light emitted from the collimating lens 104 is reflected by a biaxial MEMS (microelectromechanical system) mirror 105 provided to the conventional projector of the laser-scanning type and is projected on a screen 106. The laser light projected on the screen 106 is scanned according to biaxial driving of the biaxial MEMS mirror 105.

By using the conventional laser optical device illustrated in FIG. 13, a brightness on the screen 106 can be substantially doubled from that of a situation where a laser optical device having only one laser element is used.

CITATION LIST

Patent Literature

Patent literature 1: JP 2007-47245 A

SUMMARY OF THE INVENTION

Technical Problem

However, as is done in the conventional optical device illustrated in FIG. 13, in a situation of joining a plurality of laser lights by a polarizing prism, a laser light after joining comes to have both a p-polarized component and an s-polarized component, becoming a light with unaligned polarization planes. Moreover, similarly to the conventional laser optical device illustrated in FIG. 13, a light-source device of patent literature 1 also joins a plurality of laser lights by a polarizing prism; therefore, a laser light after joining becomes a light with unaligned polarization planes.

For example, in a situation where a polarizing element is disposed between the conventional laser optical device illustrated in FIG. 13 and the screen, a light with unaligned polarization planes is output from the conventional laser optical device illustrated in FIG. 13; therefore, a problem arises of efficiency decreasing in the polarizing element.

In view of the conditions above, the present invention has as an object to provide a laser optical device with no restriction in optical characteristics of a plurality of lights to be joined and a projector and head-up display provided therewith.

Solution to Problem

To achieve the object above, a laser optical device according to the present invention is made to be of a configuration provided with a plurality of laser light sources, a collimating lens that has an optical axis that intersects a line connecting the plurality of laser light sources in a plan view viewed from a direction perpendicular to both this line and the optical axis and collimates lights respectively emitted from the plurality of laser light sources, and a deflecting element that deflects at least one among a plurality of lights emitted from the collimating lens so output lights where the lights respectively emitted from the plurality of laser light sources are optically processed make contact or overlap.

The laser optical device of the configuration above may adopt a configuration where the lights respectively emitted from the plurality of laser light sources have identical polarization characteristics.

The laser optical device of the configuration above may adopt a configuration where the plurality of laser light sources is present in the same laser chip.

The laser optical device of the configuration above may adopt a configuration where a deflection efficiency of the deflecting element becomes maximal or substantially maximal when the laser light source emits light near a usage maximum temperature.

The laser optical device of the configuration above may adopt a configuration where the deflecting element is a diffraction grating and a pitch of a groove formed in a diffraction-grating surface of the diffraction grating changes along a longitudinal direction of the groove.

The laser optical device of the configuration above may adopt a configuration where the deflecting element deflects at least one of a plurality of lights with mutually-different emission directions emitted from the collimating lens at a deflection angle greater than a situation of deflecting at least one of the plurality of lights with mutually-different emission directions emitted from the collimating lens in a direction along the optical axis.

A projector according to one embodiment of the present invention can adopt a configuration provided with a scanning means that forms a two-dimensional projection image by scanning a light from the laser optical device of the configuration above in a first scanning direction and a second scanning direction orthogonal to the first scanning direction. Moreover, the projector of the configuration above may adopt a configuration where a projection light corresponding to one pixel of the two-dimensional projection image includes sub-projection lights based on the lights from the plurality of laser light sources and centers of the sub-projection lights line up along the first scanning direction, in which pixels of the two-dimensional projection image are projected continuously.

A head-up display according to one embodiment of the present invention can adopt a configuration provided with the projector of the configuration above and a projection member for displaying a projection image of the projector.

Furthermore, a laser optical device in one embodiment of the present invention is provided with: a laser light source unit that emits a first laser light from a first emission point and emits a second laser light from a second emission point different from the first emission point; a deflecting element that receives the first laser light and the second laser light, deflects at least one among luminous fluxes of the first laser light and the second laser light, and emits the luminous fluxes as a first emitted luminous flux and a second emitted luminous flux; and a collimating lens that makes the first emitted luminous flux and the second emitted luminous flux emitted from the deflecting element into parallel luminous fluxes; wherein the deflecting element deflects at least one among the luminous fluxes of the first laser light and the second laser light so an angle formed between optical axes of the first emitted luminous flux and the second emitted luminous flux spreads wider than a spreading angle of the luminous fluxes of the first laser light and the second laser light and a virtual image of a light source of the first emitted luminous flux and a virtual image of a light source of the second emitted luminous flux overlap, and the deflecting element is disposed so a distance between the deflecting element and the laser light source unit is not more than a predetermined distance sought by formula (1) below.

$$\text{Predetermined distance } L1 = D1/\tan(\theta 1/2) \quad (1)$$

Here,

D1: value half a distance between the first emission point and the second emission point, and θ1: spreading angle of the luminous fluxes.

Furthermore, a laser optical device in one embodiment of the present invention is provided with: a laser light source unit that emits a first laser light from a first emission point and emits a second laser light from a second emission point different from the first emission point; a collimating lens that makes the first laser light and the second laser light parallel luminous fluxes; and a deflecting element that deflects at least one among a plurality of lights emitted from the collimating lens so the first laser light and the second laser light emitted from the collimating lens contact each other or overlap; wherein the deflecting element is disposed so a distance between the deflecting element and the collimating lens is not less than a predetermined distance sought by formula (2) below.

$$\text{Predetermined distance } L2 = f \cdot 2 \cdot \sin(\theta 2/2)/D2 \quad (2)$$

Here, f: distance between the laser light source unit and the collimating lens,

θ2: spreading angle of the luminous fluxes of the first laser light and the second laser light, and D2: value half a distance between the first emission point and the second emission point.

Advantageous Effects of Invention

According to the present invention, a laser optical device with no restriction in optical characteristics of a plurality of lights to be joined and a projector and head-up display provided therewith can be realized.

DESCRIPTION OF EMBODIMENTS

Examples and embodiments of the present invention are described below with reference to the drawings. The examples and the embodiments described below are but illustrative examples; the present invention is not limited to the examples and the embodiments described below. As long as no contradiction arises, examples and embodiments can be implemented by being combined as appropriate, and as long as no contradiction arises, illustrative examples and modified examples described in examples and embodiments can also be applied to other examples and embodiments.

First Example

Figure 1:
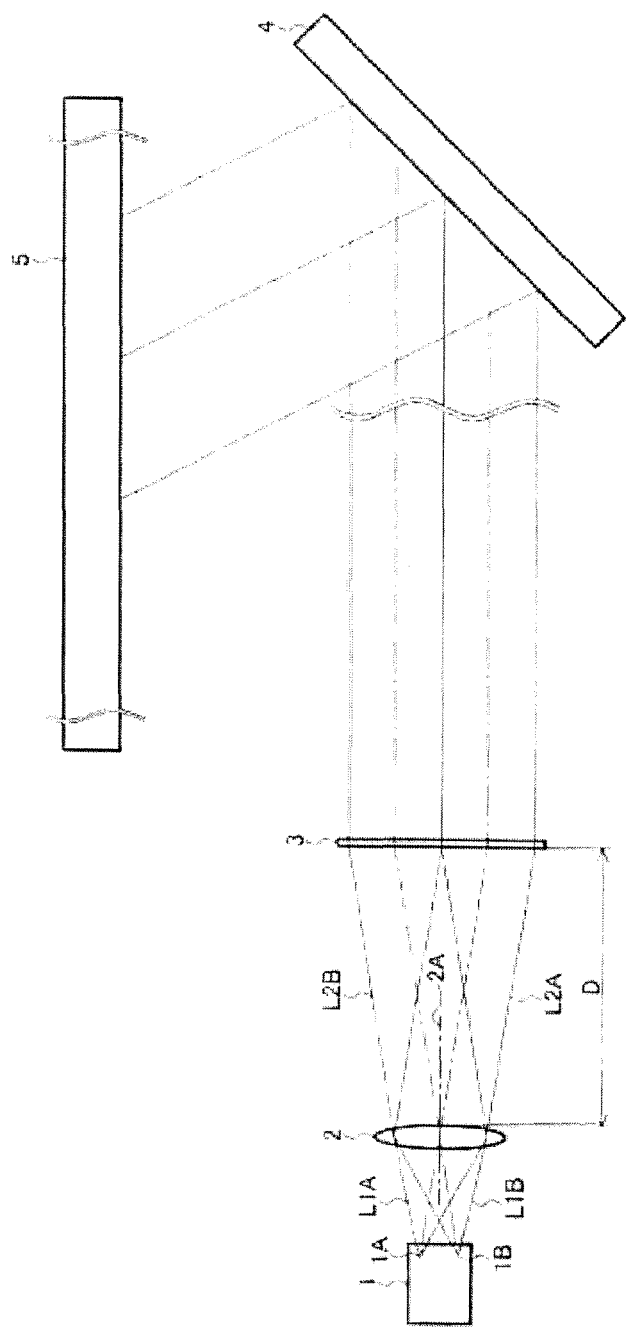
FIG. 1 is a diagram illustrating a schematic configuration of a projector according to one embodiment of the present invention.

As illustrated in FIG. 1, a laser optical device according to one or more embodiments of a first example of the present invention is provided with a laser light source unit 1, a collimating lens 2, and a deflecting element 3 such as a diffraction grating. The laser light source unit 1 has mutually-different laser light sources 1A and 1B. The laser light source unit 1 emits a laser light L1A from the laser light source 1A and a laser light L1B from the laser light source 1B. Wavelengths of the laser lights L1A and L1B are identical or substantially identical to each other.

The collimating lens 2 converts both the laser lights L1A and L1B emitted from the laser light sources 1A and 1B of the laser light source unit 1 into a parallel light or a substantially-parallel light ("parallel light or substantially-parallel light" is abbreviated as "parallel light" hereinbelow).

An optical center axis (optical axis) 2A of the collimating lens 2 is disposed to be orthogonal to a line connecting the two laser light sources 1A and 1B in a plan view viewed from a direction perpendicular to both this line and the optical axis 2A and pass through a midpoint of this line; therefore, after passing through the collimating lens 2, the laser lights L1A and L1B become parallel lights L2A and L2B that travel away from the optical center axis 2A of the collimating lens 2 in mutually-opposite directions and at identical angles relative to the optical center axis 2A of the collimating lens 2.

The parallel lights L2A and L2B emitted from the collimating lens 2 become beams that do not mutually intersect at a position away a distance D from the collimating lens 2; the deflecting element 3 is disposed in this position. Note that unlike the embodiments of the present example, the deflecting element 3 may be disposed in a position where the parallel lights L2A and L2B emitted from the collimating lens 2 are mutually-intersecting beams—that is, a position not as far away as the distance D from the collimating lens 2.

Figure 2A:
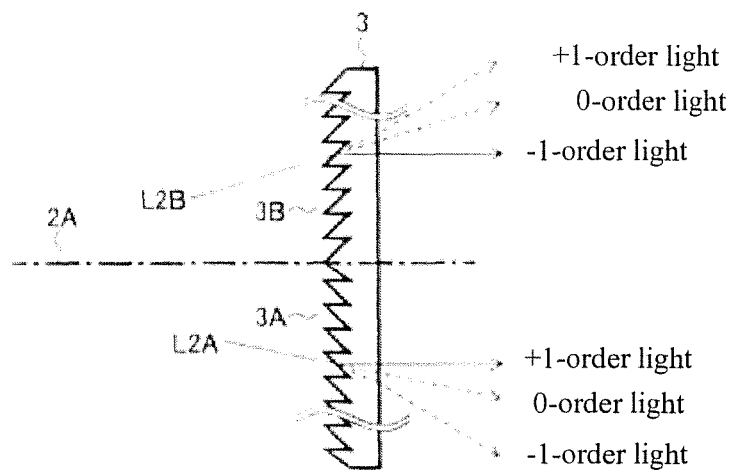
FIG. 2A is a side view illustrating one example of a deflecting element used in one embodiment of the present invention.

For example, as illustrated in FIG. 2A, the deflecting element 3 is a transmissive diffraction grating having diffraction grating surfaces 3A and 3B on a collimating-lens 2 side. The diffraction grating surface 3A is a surface of a blazed shape optimized for the wavelength (design value) of the laser light L1A, and the diffraction grating surface 3B is a surface of a blazed shape optimized for the wavelength (design value) of the laser light L1B.

As illustrated in FIG. 2A, at the diffraction grating surface 3A, only a +1-order light of the parallel light L2A is emitted; the parallel light L2A is diffracted in a direction along the optical center axis 2A of the collimating lens 2. Moreover, as illustrated in FIG. 2A, at the diffraction grating surface 3B, only a −1-order light of the parallel light L2B is emitted; the parallel light L2B is diffracted in the direction along the optical center axis 2A of the collimating lens 2. That is, the deflecting element 3 respectively deflects the parallel lights L2A and L2B emitted from the collimating lens 2 in the direction along the optical center axis 2A of the collimating lens 2. By this deflection at the deflecting element 3, output lights where the lights respectively emitted from the two laser light sources 1A and 1B are optically processed (the +1-order light of the parallel light L2A and the −1-order light of the parallel light L2B) make contact and the two laser lights are joined.

Figure 2B:
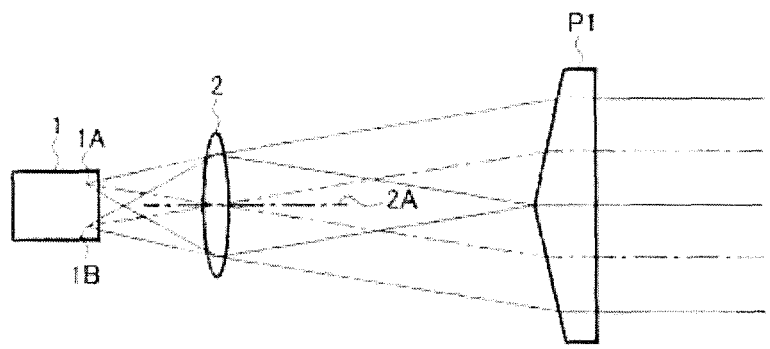
FIG. 2B is a diagram illustrating a schematic configuration of a laser optical device using a prism as the deflecting element.
Figure 2C:
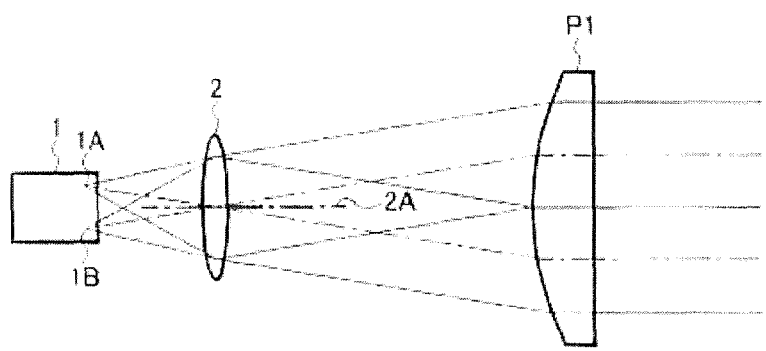
FIG. 2C is a diagram illustrating a schematic configuration of the laser optical device using a prism as the deflecting element.
Figure 2D:
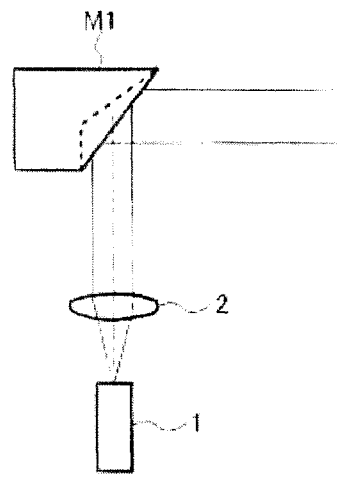
FIG. 2D is a front view illustrating a schematic configuration of the laser optical device using a mirror as the deflecting element.
Figure 2E:
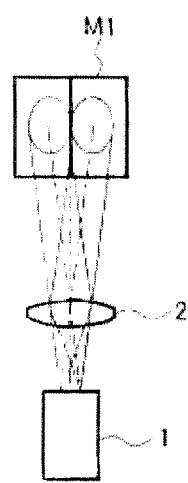
FIG. 2E is a side view illustrating the schematic configuration of the laser optical device using the mirror as the deflecting element.
Figure 2F:
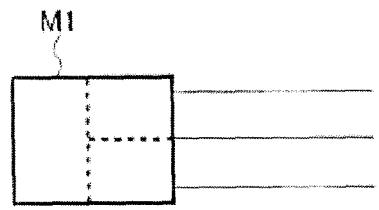
FIG. 2F is a top view illustrating the schematic configuration of the laser optical device using the mirror as the deflecting element.
Figure 2G:
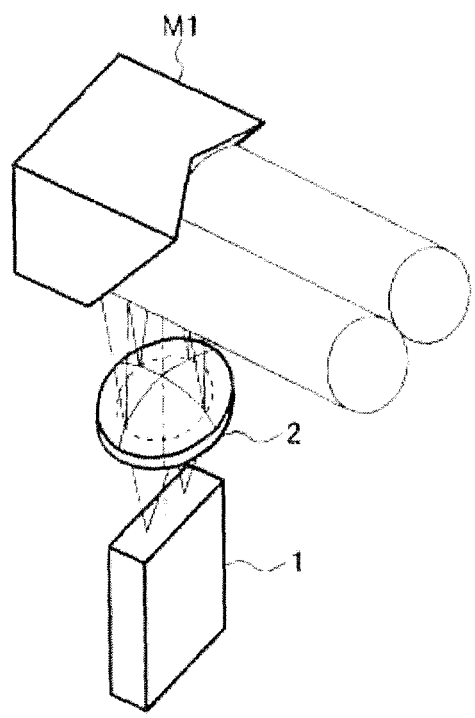
FIG. 2G is a perspective view illustrating the schematic configuration of the laser optical device using the mirror as the deflecting element.

From a viewpoint of improving a precision of relative positions of the diffraction grating surface 3A and the diffraction grating surface 3B, the deflecting element 3 is preferably an integrally-molded article; however, the deflecting element 3 may be configured by a component having the diffraction grating surface 3A and a component having the diffraction grating surface 3B. Note that unlike the embodiments in the present example, a deflecting element other than a diffraction grating may be used. As deflecting elements other than a diffraction grating, for example, a prism, a mirror, and a liquid-crystal diffraction grating can be mentioned. In a situation where a prism P1 is used as the deflecting element, the laser optical device adopts a configuration such as that illustrated in FIG. 2B or FIG. 2C. When an incidence surface of the prism P1 is made to be a curved surface as illustrated in FIG. 2C, further effects such as an improvement of a total aberration and beam shaping can be obtained. Moreover, in a situation where a mirror M1 is used as the deflecting element, the laser optical device adopts a configuration such as that illustrated in FIGS. 2D to 2G.

The laser optical device according to the embodiments of the present example described above is of a configuration provided with the two laser light sources 1A and 1B, the collimating lens 2 that has the optical axis 2A that is orthogonal to the line connecting the two laser light sources 1A and 1B in the plan view viewed from the direction perpendicular to both this line and the optical axis 2A and collimates the lights L1A and L1B respectively emitted from the two laser light sources 1A and 1B, and the deflecting element 3 that deflects the two lights L2A and L2B emitted from the collimating lens 2 so the output lights where the lights respectively emitted from the two laser light sources 1A and 1B are optically processed make contact.

The laser optical device according to the embodiments of the present example joins two laser lights; therefore, a brightness of a laser light output from the laser optical device (a laser light after joining) can be increased.

Furthermore, the laser optical device according to the embodiments of the present example joins the two laser lights by deflection at the deflecting element 3; therefore, polarization planes of the two laser lights that are joined may be aligned or unaligned. That is, with the laser optical device according to the embodiments of the present example, optical characteristics of the two laser lights that are joined are not restricted.

Therefore, the laser optical device according to the embodiments of the present example can be made to adopt a configuration where the laser lights L1A and L1B emitted from the laser light sources 1A and 1B have identical polarization characteristics. According to this configuration, the laser light after joining becomes a light with aligned polarization planes. For example, in a situation where a deflecting element is disposed at a subsequent stage of the laser optical device according to the embodiments of the present example, the light with aligned polarization planes is output from the laser optical device according to the embodiments of the present example; therefore, there is an advantage where efficiency does not decrease in the deflecting element.

Figure 13:
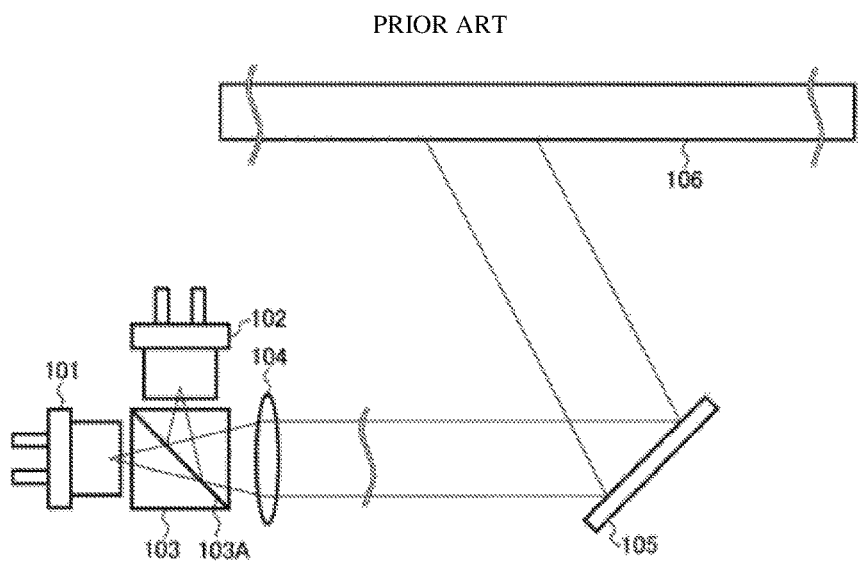
FIG. 13 is a diagram illustrating one configuration example of a conventional laser optical device.

Furthermore, in a conventional laser optical device illustrated in FIG. 13, a semiconductor laser element 101 and a semiconductor laser element 102 are away from each other. Because of this, there is a fear that by distortion arising in a housing that houses the semiconductor laser elements 101 and 102 due to a temperature change, aging degradation, or the like, a large misalignment will arise in a relative positional relationship between the semiconductor laser element 101 and the semiconductor laser element 102, worsening a joining degree of laser lights.

Figure 3:
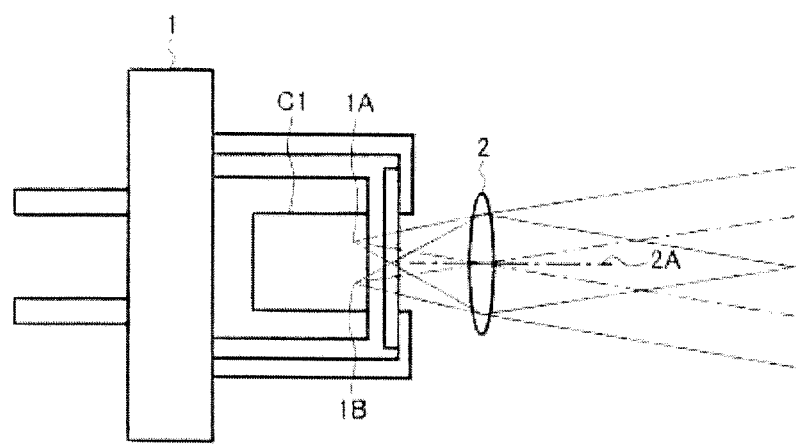
FIG. 3 is a cross-sectional view illustrating one example of a laser light source unit.

In contrast thereto, in the laser optical device according to the embodiments of the present example, the laser light source 1A and the laser light source 1B are close to each other. Because of this, it is less likely for a misalignment to arise in a relative positional relationship between the laser light source 1A and the laser light source 1B. While, for example, the laser light source unit 1 can also be configured by disposing a semiconductor laser element having the laser light source 1A and a semiconductor laser element having the laser element 1B close to each other, as illustrated in FIG. 3, when the laser light source unit 1 is configured using a single laser chip C1 having the laser light sources 1A and 1B, it becomes even less likely for a misalignment to arise, which is preferable.

As illustrated in FIG. 1, a projector according to an embodiment of the present example is a projector of a laser-scanning type and is provided with the laser optical device above, a biaxial MEMS mirror 4, a laser light source driver (not illustrated) that performs driving control of the laser light source unit 1, a mirror servo unit (not illustrated) that drives the biaxial MEMS mirror 4, a CPU (not illustrated), a housing unit (not illustrated) that houses these, and a window member (not illustrated) that blocks an opening portion provided in the housing unit. Note that the laser optical device may be provided as appropriate with an optical element other than the laser light source unit 1, the collimating lens 2, and the deflecting element 3.

The laser light source driver can respectively perform driving control relating to ON/OFF of light emission, output, and the like for the laser light sources 1A and 1B of the laser light source unit 1.

The mirror servo unit drives the biaxial MEMS mirror 4 according to a horizontal synchronization signal from the CPU to displace a reflection direction of a laser light in a horizontal direction by the biaxial MEMS mirror 4. Moreover, the mirror servo unit drives the biaxial MEMS mirror 4 according to a vertical synchronization signal from the CPU to displace the reflection direction of the laser light in a vertical direction by the biaxial MEMS mirror 4. Note that a horizontally-scanning MEMS mirror and a vertically-scanning MEMS mirror may be used instead of the biaxial MEMS mirror 4. In this situation, the mirror servo unit drives the horizontally-scanning MEMS mirror according to the horizontal synchronization signal from the CPU and drives the vertically-scanning MEMS mirror according to the vertical synchronization signal from the CPU.

The CPU is provided with a video processing unit, a driver control unit, and a mirror control unit. The video processing unit generates video information based on a program stored in a storage unit or the like that is not illustrated, information relating to video input from an input/output interface that is not illustrated, and the like. The video processing unit converts the generated video information into video data of a single color. The converted video data of the single color is output to the driver control unit. The driver control unit generates a light control signal based on the video data of the single color and outputs the light control signal to the laser light source driver. The mirror control unit generates a control signal for controlling a position of the biaxial MEMS mirror 4 based on the video information and outputs the control signal to the mirror servo unit.

The laser light reflected by the biaxial MEMS mirror 4 is projected on a screen 5, and a two-dimensional image of a single color is formed on the screen 5.

Second Example

Figure 4:
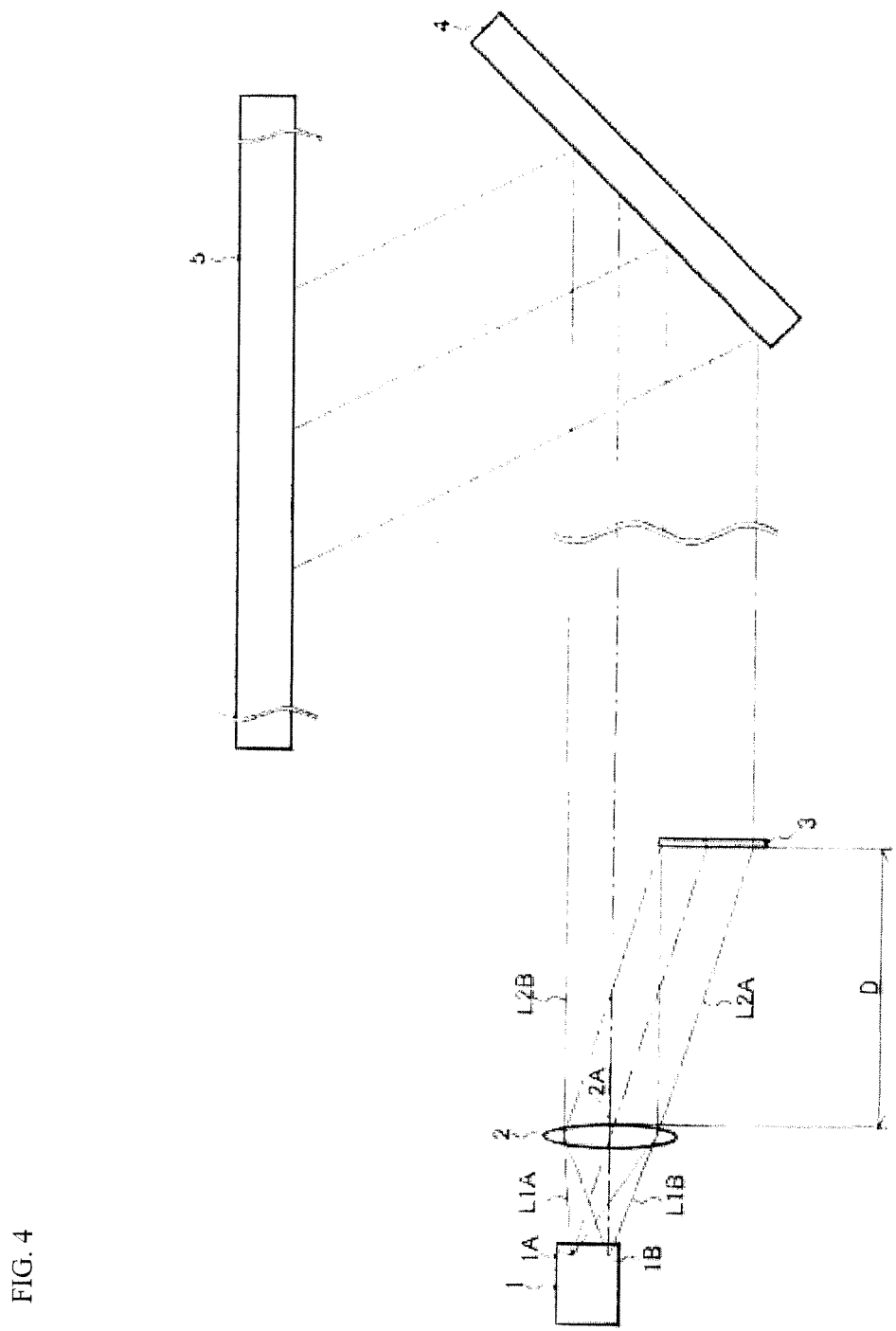
FIG. 4 is a diagram illustrating a schematic configuration of a projector according to one embodiment of the present invention.

FIG. 4 is a diagram illustrating a schematic configuration of a projector according to one embodiment of the present invention. In FIG. 4, portions identical or similar to FIG. 1 are labeled with identical reference signs.

A laser optical device according to an embodiment of the present example provided by a projector according to an embodiment of the present example differs from the laser optical device according to the embodiments of the first example in a position of a laser light source 1B and a position and a configuration of a deflecting element 3.

The laser light source 1B is positioned on an optical center axis 2A of a collimating lens 2. Therefore, after passing through the collimating lens 2, a laser light L1B becomes a parallel light L2B that travels along the optical center axis 2A of the collimating lens 2.

The parallel light L2B does not become incident to the deflecting element 3, and only a parallel light L2A becomes incident thereto. The deflecting element 3 is a transmissive diffraction grating having on a collimating-lens 2 side a diffraction grating surface of a blazed shape optimized for a wavelength (design value) of a laser light L1A. That is, the deflecting element 3 deflects only the parallel light L2A emitted from the collimating lens 2 in a direction along the optical center axis 2A of the collimating lens 2. By this deflection at the deflecting element 3, the two laser lights are joined. According to the embodiment of the present example, effects similar to those of the embodiments of the first example are exhibited.

Furthermore, in the embodiment of the present example, a laser light source may be added to a laser light source unit 1, each laser light source may be disposed so a laser light source 1B comes between the added laser light source and a laser light source 1A, and a deflecting element corresponding to the added laser light source may be added. In this situation, by deflection at the deflecting element 3 and deflection at the added deflecting element, three laser lights are joined. That is, in the laser optical device according to the present invention, a number of lights that are joined is not limited to two.

Third Example

A laser optical device according to one embodiment of the present invention differs from the laser optical device according to the embodiments of the first example in that a laser light L1A emitted from a laser light source 1A of a laser light source unit 1 and a laser light L1B emitted from a laser light source 1B of the laser light source unit 1 are mutually-different colors but is otherwise identical to the laser optical device according to the embodiments of the first example. A laser optical device according to an embodiment of the present example can exhibit effects similar to those of the laser optical device according to the embodiments of the first example. Note that in a situation where a collimating lens 2 is only optimized for a wavelength of the laser light L1A or a wavelength of the laser light L1B, by applying a multicoat corresponding to both wavelengths or imparting a lens effect that cancels an aberration generated due to lack of optimization to a deflecting element of a subsequent stage, efficiency similar to that of the embodiments of the first example can be obtained.

For example, the wavelength (design value) of the laser light L1A emitted from the laser light source 1A of the laser light source unit 1 is made to be 660 nm, and the wavelength (design value) of the laser light L1B emitted from the laser light source 1B of the laser light source unit 1 is made to be 520 nm. In this situation, a laser light after joining is divided into a region of a wavelength of 660 nm and a region of a wavelength of 520 nm when observed in a far-field region but becomes one laser light of mixed colors according to the wavelengths of 660 nm and 520 nm when observed in a near-field region.

Fourth Example

Figure 5:
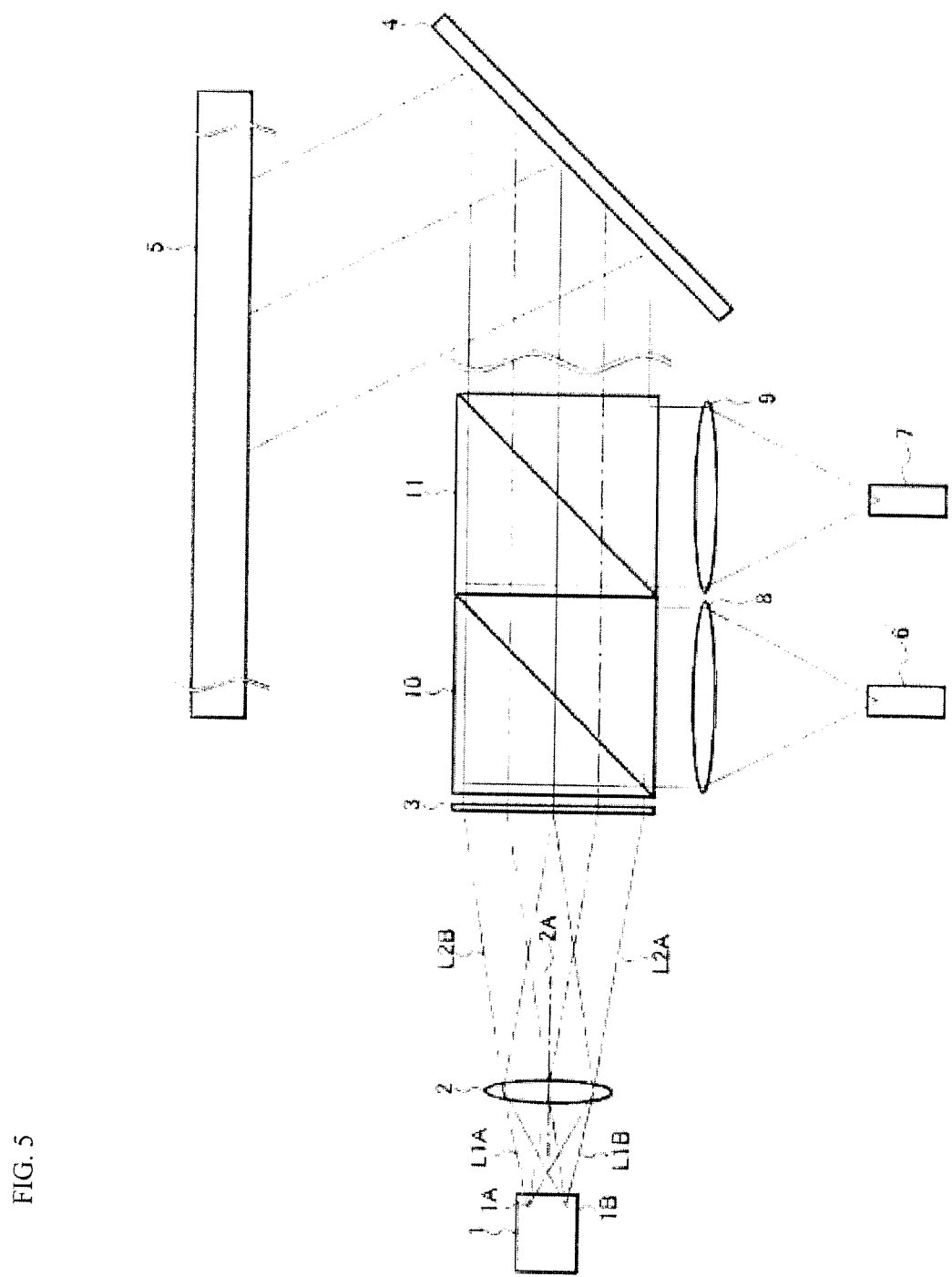
FIG. 5 is a diagram illustrating a schematic configuration of a projector according to one embodiment of the present invention.

FIG. 5 is a diagram illustrating a schematic configuration of a projector according to one embodiment of the present invention. In FIG. 5, portions identical or similar to FIG. 1 are labeled with identical reference signs.

A laser optical device according to an embodiment of the present example provided by a projector according to an embodiment of the present example is of a configuration where a blue laser light source unit 6, a green laser light source unit 7, collimating lenses 8 and 9, and dichroic prisms 10 and 11 are added to the laser optical device according to the embodiments of the first example.

A laser light source unit 1 has a red laser light source using an AlGaInP (aluminum-gallium-indium-phosphorous) compound semiconductor crystal, and wavelengths of laser lights L1A and L1B emitted from the laser light source unit 1 are 640 nm. With the red laser light source using the compound semiconductor crystal of AlGaInP, due to characteristics of the AlGaInP compound semiconductor crystal, an oscillation wavelength shifts about 0.2 nm to a long-wavelength side each time a temperature of the light source increases 1° C. Moreover, a diffraction efficiency of a diffraction grating changes according to a wavelength of a light that becomes incident thereto. With semiconductor lasers, the higher a temperature, the more a light-emission power decreases; therefore, by designing so the diffraction efficiency of the diffraction grating becomes maximal or substantially maximal when the red laser light source of the laser light source unit 1 undergoes light emission near a usage maximum temperature, a minimum value of a light-emission brightness in a usage temperature range can be improved. For example, in a situation of a design package temperature of 25° C. and a red semiconductor laser of a design wavelength of 640 nm, assuming that a package temperature during high-temperature usage becomes 90° C., a wavelength comes to increase 13 nm from the design wavelength by wavelength fluctuation due to temperature characteristics; therefore, a diffraction grating shape is set so efficiency is maximized at a wavelength of 652 nm.

The blue laser light source unit 6 has a single laser light source. A blue laser light of a wavelength of 450 nm (design value) is emitted from the laser light source of the blue laser light source unit 6. The blue laser light emitted from the blue laser light source unit 6 becomes incident to the dichroic prism 10 after being converted into a parallel light by the collimating lens 8.

The green laser light source unit 7 has a single laser light source. A green laser light of a wavelength of 520 nm (design value) is emitted from the laser light source of the green laser light source unit 7. The green laser light emitted from the green laser light source unit 7 becomes incident to the dichroic prism 11 after being converted into a parallel light by the collimating lens 9.

The dichroic prism 10 has characteristics of transmitting a light of a red band and reflecting a light of a blue band. Because of this, by a red laser light after being joined by deflection at a deflecting element 3 being transmitted through the dichroic prism 10 and a blue laser light emitted from the collimating lens 8 being reflected in the dichroic prism 10, both laser lights become a single beam, and this beam is emitted from the dichroic prism 10 and becomes incident to the dichroic prism 11.

The dichroic prism 11 has characteristics of transmitting a light of a red band and a light of a blue band and reflecting a light of a green band. Because of this, by the light from the dichroic prism 10 being transmitted through the dichroic prism 11 and a green laser light emitted from the collimating lens 9 being reflected in the dichroic prism 11, both laser lights become a single beam, and this beam is emitted from the dichroic prism 11 and becomes incident to a biaxial MEMS mirror 4.

Figure 6:
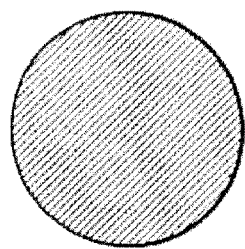
FIG. 6 is a diagram illustrating a cross-sectional shape of a light.
Figure 7A:
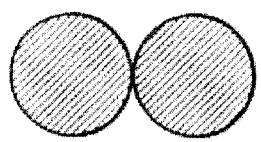
FIG. 7A is a diagram illustrating a cross-sectional shape of lights.
Figure 7B:
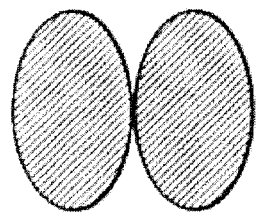
FIG. 7B is a diagram illustrating a cross-sectional shape of lights.

Whereas a cross-sectional shape of each parallel light emitted from the collimator lenses 8 and 9 becomes the perfect circle or the substantially-perfect circle illustrated in FIG. 6 ("perfect circle or substantially-perfect circle" is abbreviated as "perfect circle" hereinbelow), a cross-sectional shape of the red laser light after being joined by deflection at the deflecting element 3 only becomes a shape where two circles are abutted, as illustrated in FIG. 7A and FIG. 7B. So this shape where two circles are abutted approaches a perfect circle, as illustrated in FIG. 7B, it is preferable to make each of the two circles an ellipse where major axis:minor axis=1:1.5 to 1:2. For example, it is favorable to make an aspect ratio between horizontal and vertical of a laser light-emission spreading angle at each laser light source of the laser unit 1 1:1.5 to 1:2.

The projector according to the embodiment of the present example is a projector of a laser-scanning type and is provided with the laser optical device above, the biaxial MEMS mirror 4, a red laser light source driver (not illustrated) that performs driving control of the laser light source unit 1, a blue laser light source driver (not illustrated) that performs driving control of the laser light source unit 6, a green laser light source driver (not illustrated) that performs driving control of the laser light source unit 7, a mirror servo unit (not illustrated) that drives the biaxial MEMS mirror 4, a CPU (not illustrated), a housing unit (not illustrated) that houses these, and a window member (not illustrated) that blocks an opening portion provided in the housing unit. Note that the laser optical device may be provided as appropriate with an optical element other than the laser light source unit 1, a collimating lens 2, the deflecting element 3, the blue laser light source unit 6, the green laser light source unit 7, the collimating lenses 8 and 9, and the dichroic prisms 10 and 11.

The red laser light source driver can respectively perform driving control relating to ON/OFF of light emission, output, and the like for laser light sources 1A and 1B of the laser light source unit 1. Moreover, the blue laser light source driver can perform driving control relating to ON/OFF of light emission, output, and the like for the laser light source of the blue laser light source unit 6, and the green laser light source driver can perform driving control relating to ON/OFF of light emission, output, and the like for the laser light source of the green laser light source unit 7.

The mirror servo unit drives the biaxial MEMS mirror 4 according to a horizontal synchronization signal from the CPU to displace a reflection direction of a laser light in a horizontal direction by the biaxial MEMS mirror 4. Moreover, the mirror servo unit drives the biaxial MEMS mirror 4 according to a vertical synchronization signal from the CPU to displace the reflection direction of the laser light in a vertical direction by the biaxial MEMS mirror 4. Note that a horizontally-scanning MEMS mirror and a vertically-scanning MEMS mirror may be used instead of the biaxial MEMS mirror 4. In this situation, the mirror servo unit drives the horizontally-scanning MEMS mirror according to the horizontal synchronization signal from the CPU and drives the vertically-scanning MEMS mirror according to the vertical synchronization signal from the CPU.

The CPU is provided with a video processing unit, a driver control unit, and a mirror control unit. The video processing unit generates video information based on a program stored in a storage unit or the like that is not illustrated, information relating to video input from an input/output interface that is not illustrated, and the like. The video processing unit converts the generated video information into video data of three colors of red, green, and blue. The converted video data of the three colors is output to the driver control unit. The driver control unit generates a red light control signal based on the video data of red and outputs the red light control signal to the red laser light source driver. Similarly, the driver control unit generates a blue light control signal based on the video data of blue and outputs the blue light control signal to the blue laser light source driver. Also similarly, the driver control unit generates a green light control signal based on the video data of green and outputs the green light control signal to the green laser light source driver. The mirror control unit generates a control signal for controlling a position of the biaxial MEMS mirror 4 based on the video information and outputs the control signal to the mirror servo unit.

The laser light reflected by the biaxial MEMS mirror 4 is projected on a screen 5, and a full-color two-dimensional image is formed on the screen 5.

Fifth Example

Figure 8:
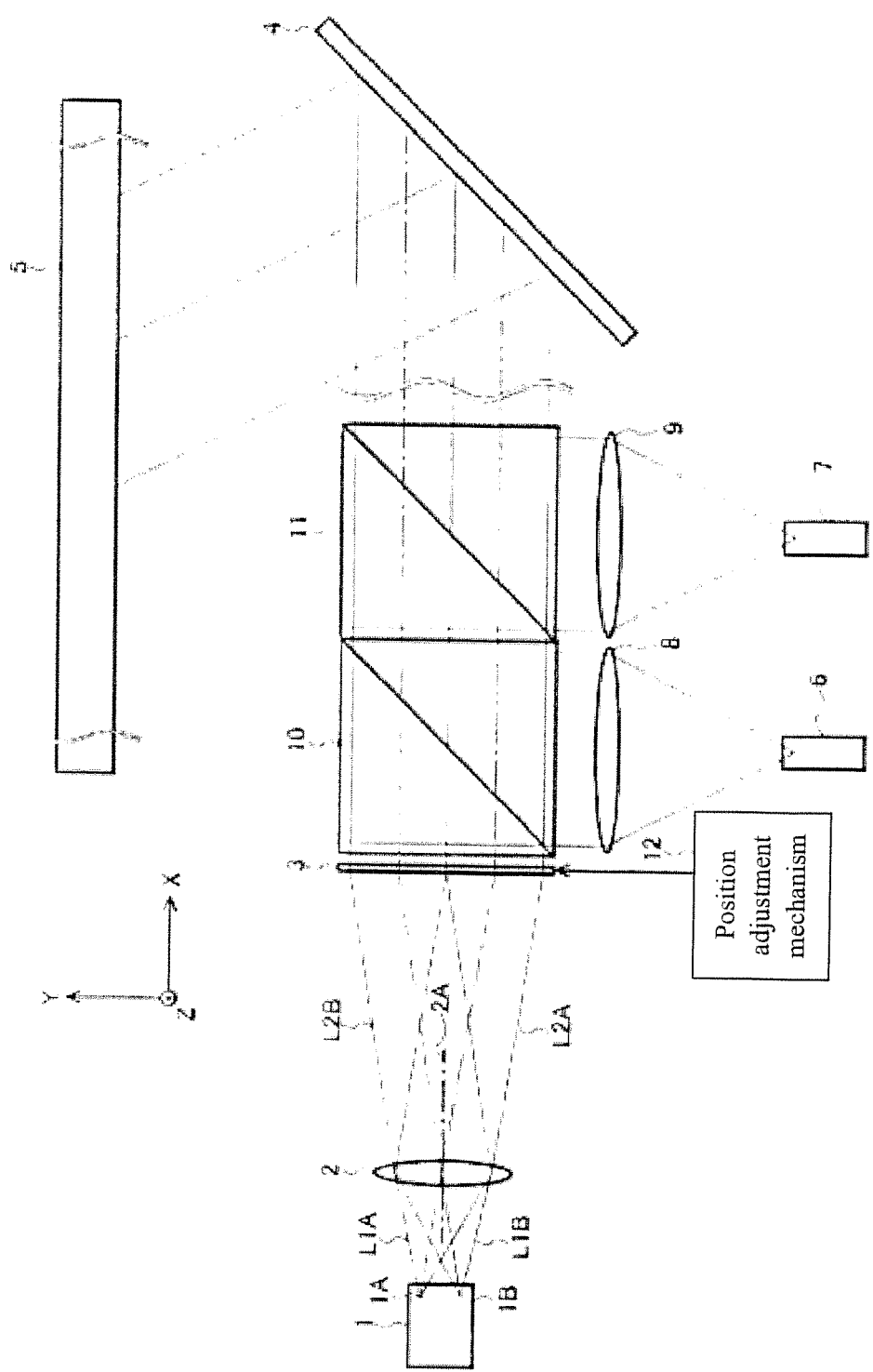
FIG. 8 is a diagram illustrating a schematic configuration of a projector according to one embodiment of the present invention.

FIG. 8 is a diagram illustrating a schematic configuration of a projector according to one embodiment of the present invention. In FIG. 8, portions identical or similar to FIG. 5 are labeled with identical reference signs.

A laser optical device according to an embodiment of the present example provided by a projector according to an embodiment of the present example differs from the laser optical device according to the embodiment of the fourth example in a shape of a deflecting element 3 and is of a configuration where further added is a position adjustment mechanism 12 that adjusts a position in a Z-axis direction of the deflecting element 3.

Variation arises in wavelengths of laser lights L1A and L1B emitted from a laser light source unit 1 due to a manufacturing error of the laser light source unit 1. In the projector according to the embodiment of the fourth example, when the wavelengths of the laser lights L1A and L1B emitted from the laser light source unit 1 shift from design values, a deflection efficiency at the deflecting element 3 decreases, and a brightness of a red light projected on the screen 5 decreases.

Figure 9A:
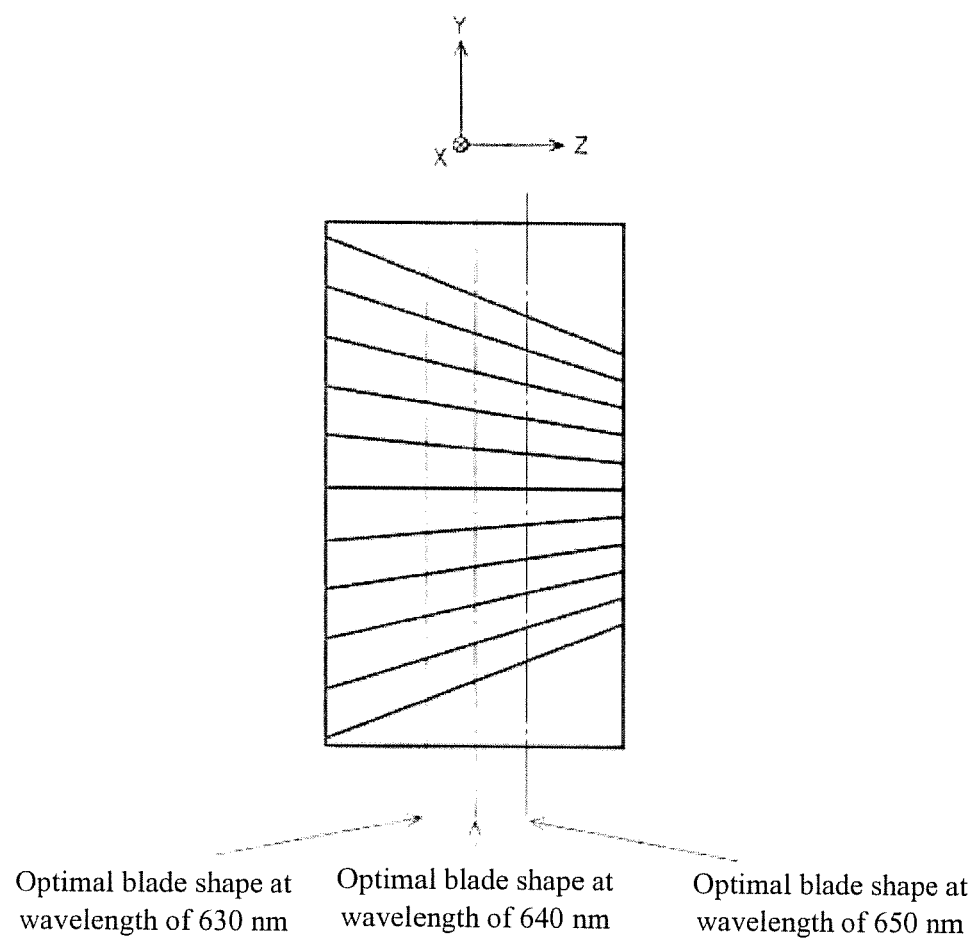
FIG. 9A is a front view illustrating one example of a deflecting element used in one embodiment of the present invention.
Figure 9B:
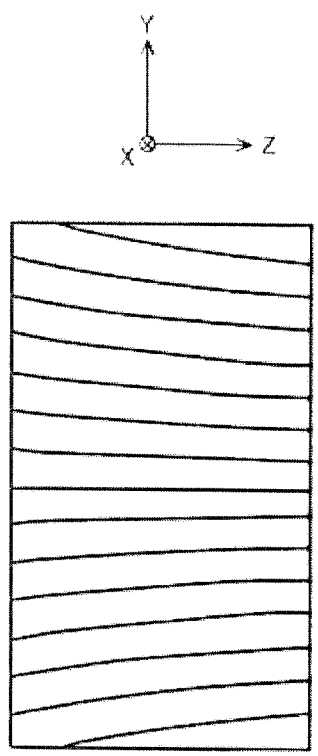
FIG. 9B is a front view illustrating another example of the deflecting element used in one embodiment of the present invention.

Therefore, as illustrated in FIG. 9A, the laser optical device according to the embodiment of the present example adopts a configuration where a groove pitch of the deflecting element 3 changes along the Z-axis direction (longitudinal direction of a groove). By this configuration, the deflection efficiency at the deflecting element 3 can be suppressed from decreasing by adjusting a Z-axis-direction position of the deflecting element 3 relative to the laser light source unit 1. In the example illustrated in FIG. 9A, the groove pitch of the deflecting element 3 varies continuously in the Z-axis direction but may adopts a shape where this varies incrementally. Moreover, in the example illustrated in FIG. 9A, a grid is formed rectilinearly from the left to the right on the page, but the grid may be formed curvilinearly from the left to the right on the page as in the example illustrated in FIG. 9B. In a situation where the grid is formed curvilinearly from the left to the right on the page as in the example illustrated in FIG. 9B, when implementing a design of adjusting the groove pitch of the deflecting element 3 by adjusting the Z-axis-direction position of the deflecting element 3 relative to the laser light source unit 1, obtainable are a further effect of being able to freely set a relationship between the Z-axis-direction position of the deflecting element 3 relative to the laser light source unit 1 and the groove pitch of the deflecting element 3 from linear to curvilinear and a further effect of being able to incorporate a function of beam shaping.

Note that unlike the embodiment of the present example, the position adjustment mechanism 12 may be not provided and the deflecting element 3 may be fixed to a housing or the like after adjusting the Z-axis-direction position of the deflecting element 3 relative to the laser light source unit 1 using manufacturing equipment or a jig of a factory when manufacturing.

The shift from the design values of the wavelengths of the laser lights L1A and L1B may also arise due to a temperature of the laser light source unit 1 as described in the fourth example. Therefore, a detection unit that detects the temperature of the laser light source unit 1 may be provided, and the position adjustment mechanism 12 may adjust the Z-axis-direction position of the deflecting element 3 relative to the laser light source unit 1 based on a detection result of this detection unit.

Sixth Example

Figure 10:
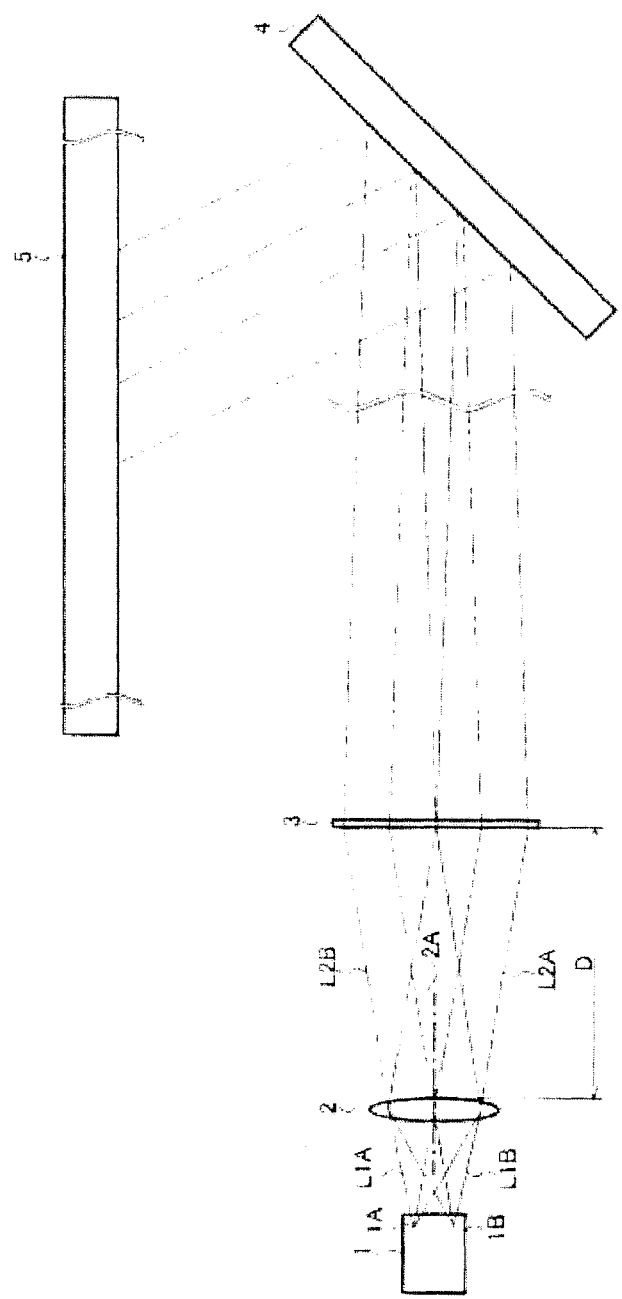
FIG. 10 is a diagram illustrating a schematic configuration of a projector according to one embodiment of the present invention.

FIG. 10 is a diagram illustrating a schematic configuration of a projector according to one embodiment of the present invention. In FIG. 10, portions identical or similar to FIG. 1 are labeled with identical reference signs.

A configuration of a laser optical device according to an embodiment of the present example provided by a projector according to an embodiment of the present example differs from that of the laser optical device according to the embodiments of the first example in a shape of a deflecting element 3.

The deflecting element 3 diffracts a parallel light L2A at a diffraction angle greater than a situation of diffracting the parallel light L2A in a direction along an optical center axis 2A of a collimating lens 2 and diffracts a parallel light L2B at a diffraction angle greater than a situation of diffracting the parallel light L2B in a direction along an optical center axis 2B of the collimating lens 2. In this situation, the deflecting element 3 comes to diffract the two lights L2A and L2B emitted from the collimating lens 2 so output lights where lights emitted from two laser light sources 1A and 1B are optically processed overlap. By this, a spot area of a laser light on a biaxial MEMS mirror 4 or a screen 5 can be made small. Therefore, a resolution of a two-dimensional image formed on the screen 5 can be improved.

Seventh Example

Figure 11:
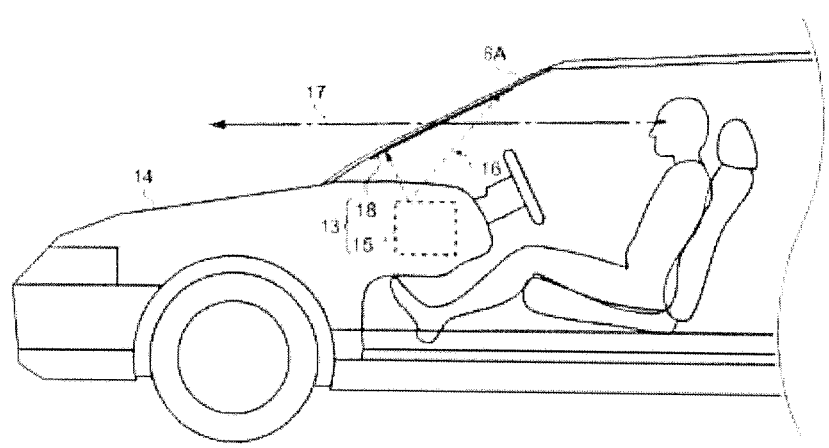
FIG. 11 is a diagram illustrating a schematic configuration of a head-up display.

Described below is an example of applying a projector according to one embodiment of the present invention to a head-up display. FIG. 11 is a schematic view of a head-up display according to an embodiment of the present example. A head-up display 13 according to the embodiment of the present example is mounted to a car 14. Note that the head-up display 13 may be mounted to another vehicle (such as an airplane) not necessarily a car. The head-up display 13 is a display device that projects a scanning laser light 16 (projection light) from a projector 15 according to the present invention toward a windshield 8A of the car 14 and displays a projection image superimposed in a field of view of a user. Note that in FIG. 11, arrow 17 of the one-dot-chain line illustrates a line of sight of the user, who is seated in a driver's seat of the car 14.

As illustrated in FIG. 11, a combiner 18 is affixed to an inner surface of the windshield 8A. This combiner 18 is a projection member for displaying the projection image of the projector 15 according to the present invention in the field of view of the user and is formed using a semitransparent reflective material such as a half mirror. By the scanning laser light 16 being projected from the projector 15 according to the present invention to the combiner 18, a virtual image is formed in a predetermined region of the combiner 18. Because of this, the user, in viewing a direction in front of the car 14 (that is, a direction of the line of sight 17), can simultaneously view an image of the outside world in front of the car 14 and the projection image projected from the projector 15 according to the present invention.

<Other>

In the embodiments described above, the line connecting the two laser light sources 1A and 1B and the optical axis 2A are orthogonal in the plan view viewed from the direction perpendicular to both this line and the optical axis 2A but are not limited to being orthogonal; it is sufficient for a line connecting the laser light sources of the laser light source unit 1 and the optical axis 2A of the collimating lens 2 to intersect in a plan view viewed from a direction perpendicular to both this line and the optical axis 2A.

Furthermore, as described above, in the laser optical device according to the embodiments, the laser light sources of the laser light source unit 1 are close to each other; therefore, it is less likely for a misalignment to arise in a relative positional relationship between the laser light sources of the laser light source unit 1. However, there is a possibility that a misalignment will arise in the relative positional relationship between the laser light sources of the laser light source unit 1 due to a temperature change, aging degradation change, or the like.

In the projector according to the embodiments described above, a projection light corresponding to one pixel of the two-dimensional projection image includes a first projection light based on an emitted light from the laser light source 1A of the laser light source unit 1 and a second projection light based on an emitted light from the laser light source 1B of the laser light source unit 1.

Figure 12A:
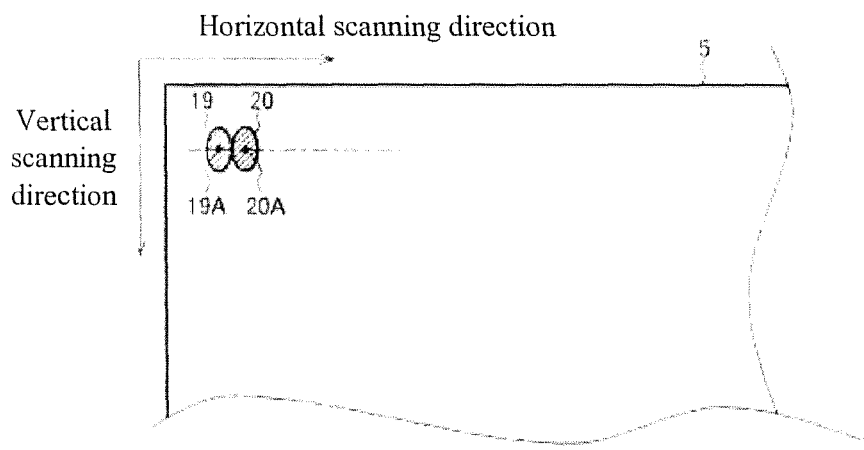
FIG. 12A is a front view of a screen.

Here, as illustrated in FIG. 12A, dispositions of the laser light sources of the laser light source unit 1 and a horizontal driving direction of the biaxial MEMS mirror 4 are determined so centers 19A and 20B of a first projection light 19 and a second projection light 20 corresponding to one pixel of the two-dimensional projection image line up along a horizontal scanning direction (direction in which pixels of the two-dimensional projection image are projected continuously).

Figure 12B:
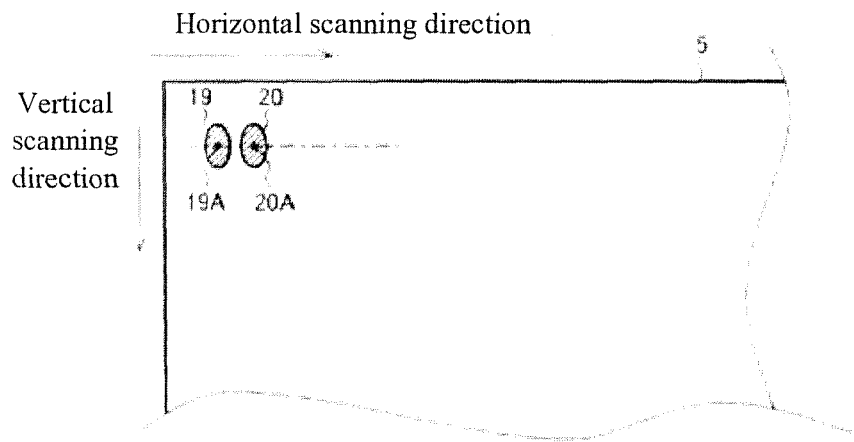
FIG. 12B is a front view of the screen.

In a situation where a misalignment arises in the relative positional relationship between the laser light sources of the laser light source unit 1, when the emitted lights from the laser light sources of the laser light source unit 1 corresponding to the one pixel of the two-dimensional projection image are output simultaneously, the first projection light and the second projection light corresponding to the one pixel of the two-dimensional projection image move away from each other as illustrated in FIG. 12B. However, when the determination described above is made, the projection state illustrated in FIG. 12B can be corrected to the projection state illustrated in FIG. 12A by shifting output timings of the emitted lights from the laser light sources of the laser light source unit 1 corresponding to the one pixel of the two-dimensional projection image by the driver control unit of the CPU. By this, the two-dimensional projection image becoming double-layered in a situation where the misalignment arises in the relative positional relationship between the laser light sources of the laser light source unit 1 can be prevented by a simple control.

As described using FIG. 13, with the conventional image projection device of the laser-scanning type, a technique is known of polarizing laser lights generated from a plurality of light sources by a light wave synthesizing element such as a polarizing prism and causing the laser lights to become incident as one laser light to a lens that converts into a parallel light for an object of compensating for a brightness deficiency on a screen (patent literature 1).

As already described, in a situation of an optical system using a polarizing prism or the like such as that illustrated in patent literature 1 (also referred to as a "conventional optical system" hereinbelow), a polarization plane of one laser among two laser elements needs to be made orthogonal to a polarization plane of the other laser; even if these are joined and collimated as-is, produced is a parallel light consisting of lights having different polarization planes. As a result, at a subsequent stage of the optical system, a conversion process that aligns the polarization planes becomes necessary; an optical system that performs this conversion process is separately necessary, and there is a possibility that a conversion loss will arise in conjunction with the conversion process.

Furthermore, a housing that houses the optical system, a chassis to which the optical system is fixed, or the like may become distorted or deformed due to a temperature change, aging degradation, or the like. In the conventional optical system, because there is a need to dispose the laser elements so respective optical axes become orthogonal, the relative positional relationship between the two laser elements may shift due to distortion or deformation of the housing or the like. As a result, there is a possibility that the image on the screen will become double-layered.

Described below are examples (eighth example to eleventh example) that enable synthesis of laser lights having a single polarization plane using laser lights emitted from a plurality of emission points and are for obtaining a synthetic light having an intensity higher than that of a laser light emitted from a single emission point.

Summary of Eighth Example to Eleventh Example

In one embodiment of the present invention, a laser optical device is provided with a laser generation unit that emits a first laser light from a first emission point and emits a second laser light from a second emission point different from the first emission point; a deflecting element that receives the first and second laser lights, deflects at least one among luminous fluxes of the first and second laser lights, and emits the luminous fluxes as first and second emitted luminous fluxes; and a collimating lens that makes the first and second emitted light fluxes emitted from the deflecting element parallel luminous fluxes; wherein the deflecting element deflects at least one among the luminous fluxes of the first and second laser lights so an angle formed between optical axes of the first and second emitted luminous fluxes spreads wider than an angle formed between optical axes of the first and second laser lights and a virtual image of a light source of the first emitted luminous flux and a virtual image of a light source of the second emitted luminous flux overlap.

According to the laser optical device according to this embodiment, the deflecting element is configured to deflect the luminous fluxes of the first and second laser lights so the angle formed between the optical axes of the first and second emitted luminous fluxes spreads wider than the angle formed between the optical axes of the first and second laser lights and so the virtual images of the light sources of the first and second emitted luminous fluxes overlap. Because of this, the first laser light emitted from the first emission point and the second laser light emitted from the second emission point can be synthesized even if these are laser lights having identical polarization planes. By this, a synthetic wave can be obtained that has an emission light intensity about double that of a situation where a laser light is emitted from a single light source and has a single polarization plane.

Meanwhile, in the conventional optical system, an intensity thereof is increased by overlapping optical axes of two emitted luminous fluxes; however, these luminous fluxes cannot be transmitted and/or reflected, for example, in a state where polarization planes of laser lights of identical or similar oscillation wavelengths are overlapped and with the optical axes thereof aligned. Therefore, a conventional technique needs a process of inputting a laser light having a straight polarization plane to a deflecting element to generate a synthetic wave with a different polarization plane and afterward aligning polarization planes.

In the laser optical device according to the embodiment above, the laser generation unit may be configured so the luminous fluxes of the first and second laser lights spread gradually toward an emission direction and the deflecting element may be configured to have a deflecting surface that deflects at least one among the luminous fluxes of the first and second laser lights, the deflecting surface being closer to the laser generation unit than a position where the luminous flux of the first laser light and the luminous flux of the second laser light overlap.

According to this configuration, the luminous fluxes of the first and second laser lights become incident to the deflecting surface before overlapping each other; therefore, light-amount loss can be prevented.

In the laser optical device according to the embodiment above, the first and second emission points may be configured to be provided on the same laser-light-emitting element.

According to this configuration, the first emission point and the second emission point are provided on the same laser-light-emitting element. That is, the first laser light and the second laser light are emitted from the same laser-light-emitting element. By this, a position misalignment between the first and second emission points due to temperature fluctuation, change over time, or the like can be prevented.

In the laser optical device according to the embodiment above, the deflecting element may be configured to be of a transmissive type and have a deflecting surface that deflects at least one among the luminous fluxes of the first and second laser lights, the deflecting surface being provided on a light-incidence-surface side to which the first and second laser lights become incident.

By this, the first and second emission points and the deflecting surface of the deflecting element can be made closer regardless of a thickness of the deflecting element in a traveling direction of the first and second laser lights.

In the laser optical device according to the embodiment above, the deflecting element may be configured to be a diffractive optical element having a first diffracting surface that diffracts the luminous flux of the first laser light and a second diffracting surface that diffracts the luminous flux of the second laser light, the first diffracting surface having a first diffracting groove portion that is formed at a pitch according to a wavelength of the first laser light in a first direction that is a direction in which the first and second laser lights are deflected and consists of a plurality of diffracting grooves extending along a second direction orthogonal to the first direction and the second diffracting surface having a second diffracting groove portion that is formed at a pitch according to a wavelength of the second laser light in the first direction and consists of a plurality of diffracting grooves extending along the second direction.

According to this configuration, a diffractive optical element can be applied as the deflecting element. A diffractive optical element has a merit of being able to be decreased in size more readily than other optical elements.

In the laser optical device according to the embodiment above, the plurality of diffracting grooves in at least one among the first and second diffracting groove portions may be configured so the pitch varies at different positions in the second direction.

According to this configuration, the pitch of the diffracting groove portion in the first direction is configured to vary according to the position in the second direction; therefore, an aberration in the first direction can be corrected at the same time as diffracting the laser light in a predetermined direction by the diffracting surface.

In the laser optical device according to the embodiment above, the plurality of diffracting grooves in at least one among the first and second diffracting groove portions may be configured to include a diffracting groove whose groove width changes gradually in the second direction.

In this manner, a configuration can be such that by the diffracting grooves of the first diffracting groove portion and/or the second diffracting groove portion including the diffracting groove whose groove width changes gradually, the pitch of the diffracting groove portion varies according to the position in the second direction. By this, the laser light can be diffracted at an optimal pitch by changing an irradiation position of the laser light in the second direction. Specifically, even in a situation where (an) oscillation wavelength(s) of the first and/or second laser light(s) emitted from the laser generation unit shift(s) from (an) oscillation wavelength(s) at the time of design due to, for example, usage temperature, manufacturing variation, or the like, it becomes possible to adjust the pitch of the diffracting groove according to this shift amount.

In the laser optical device according to the embodiment above, the deflecting element may be configured to be a refractive optical element having a first refracting surface that refracts the luminous flux of the first laser light and a second refracting surface that refracts the luminous flux of the second laser light.

According to this configuration, a refractive optical element can be applied as the deflecting element. A refractive optical element has merits of, for example, a prism being able to be used and, in a situation where the prism is used, a structure thereof being simple.

In the laser optical device according to the embodiment above, at least one among the first and second refracting surfaces may be configured to be a curved surface protruding in a convex-lens shape.

By making the first refracting surface and/or the second refracting surface the curved surface of the convex-lens shape, an aberration arising in the laser optical device can be corrected at the same time as refracting the laser light in a predetermined direction by the refracting surface.

In the laser optical device according to the embodiment above, the deflecting element may be configured to be a reflective optical element having a first reflecting surface that reflects the luminous flux of the first laser light and a second reflective surface that reflects the luminous flux of the second laser light.

According to this configuration, a reflective optical element can be applied as the deflecting element. In a situation where a reflecting optical element is used as the deflecting element, there is a merit where a deflection angle does not change according to the wavelengths of the first and second laser lights.

In one embodiment of the present invention, an image projection device is provided with the laser optical device according to the embodiments described above and a scanning mirror that projects an image by two-dimensionally deflecting and scanning a laser light emitted from the collimating lens.

According to this embodiment, a synthetic parallel light that has a single polarization plane and an increased light-emission intensity can be emitted by the laser optical device according to the embodiments above; therefore, compared to a situation where synthesized are laser lights of different polarization planes, a resolution of the image projected from the image projection device can be increased, and an image projection device with high reliability can be realized.

The image projection device of the above embodiment may be configured to be provided with a control unit that receives image data to be projected by the image projection device and controls a timing of emitting the first laser light, which corresponds to the image data, and the second laser light, which corresponds to the image data, wherein one among scanning directions of the scanning mirror is aligned in the direction in which the laser optical device deflects at least one among the luminous fluxes of the first and second laser lights.

According to the present embodiment, in a situation where a misalignment arises in the image projected from the image projection device due to, for example, a misalignment in a relative positional relationship between the first emission point and the second emission point, the misalignment of the image can be corrected by adjusting the emission timings of the first and second laser lights by the control unit. By this, a direction in which the misalignment of the image arises due to the position misalignment between the first emission point and the second emission point and the scanning direction of the laser light are aligned; therefore, a shift in a time to correct the image misalignment above is decreased, and as a result, a capacity of a buffer that temporarily stores the image data and the like can be decreased.

According to a laser optical device in one embodiment of the present invention, by spreading the angle between the optical axis of the first emitted luminous flux and the optical axis of the second emitted luminous flux and matching the virtual images of the light sources thereof, light-emission intensities thereof can be increased by synthesis even if, for example, these are a plurality of laser lights having identical polarization planes. That is, the laser optical device of the present invention enables synthesis of laser lights having a single polarization plane using laser lights emitted from a plurality of emission points and can obtain a synthetic light having an intensity higher than that of a laser light emitted from a single emission point.

Eighth Example

Figure 14:
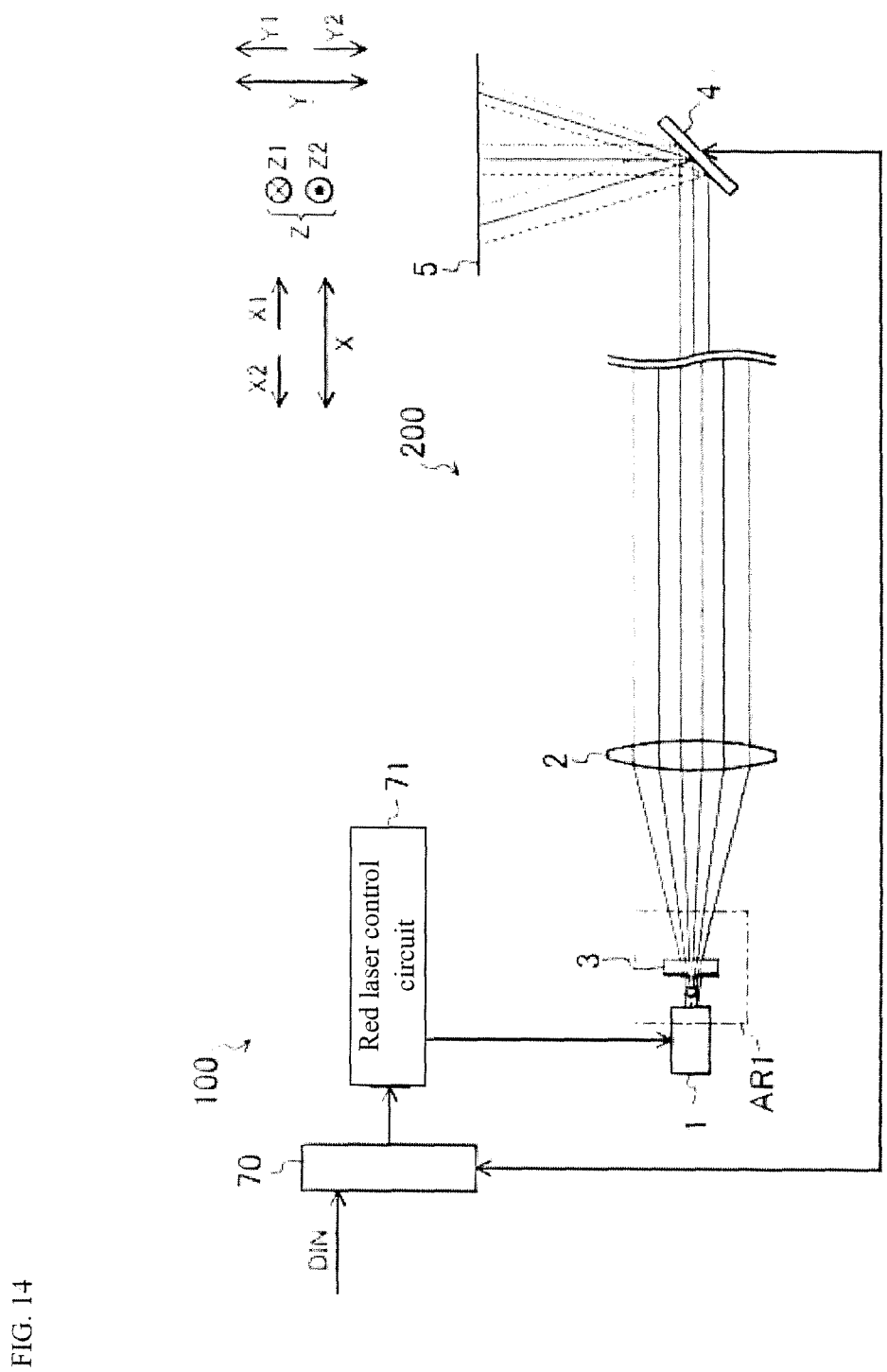
FIG. 14 is a schematic view illustrating a configuration of an image projection device according to one embodiment of the present invention.

FIG. 14 is a conceptual diagram illustrating an image projection device 100 according to one embodiment of the present invention and principally illustrates components relating to a laser optical device 200 that is described below. The image projection device 100 two-dimensionally deflects and scans by a biaxial MEMS mirror 4 a laser light emitted from the laser optical device 200 and projects the laser light on a screen 5 surface. An intensity of a laser light emitted from a laser light source unit 1 that is described below is controlled by a red laser control circuit 71. A control IC 70 as a control unit receives image data DIN such as video data and sends to the red laser control circuit 71 conversion data that is converted into a laser light intensity based on this image data DIN. Moreover, the control IC 70 controls two-dimensional scanning by the biaxial MEMS mirror 4.

The laser optical device 200 is provided with the laser light source unit 1 as a laser generation unit or a laser-light-emitting element, a deflecting element 3, and a collimating lens 2. Moreover, the laser optical device 200, after deflecting laser lights emitted from different emission points and matching virtual images of light sources of deflected luminous fluxes, outputs the laser lights as laser lights parallel to optical axes of the light sources of these virtual images (also referred to below as simply "parallel lights"). The deflecting element 3 is configured so a maximum diffraction efficiency can be obtained at an oscillation wavelength of the laser light source unit 1, and the collimating lens 2 is optimized to the oscillation wavelength of the laser light source unit 1. Note that in the present disclosure, "parallel light" indicates a substantially-parallel laser light and is a concept that includes a laser light whose beam diameter is widened or narrowed due to wave characteristics of the light or the like.

Figure 15:
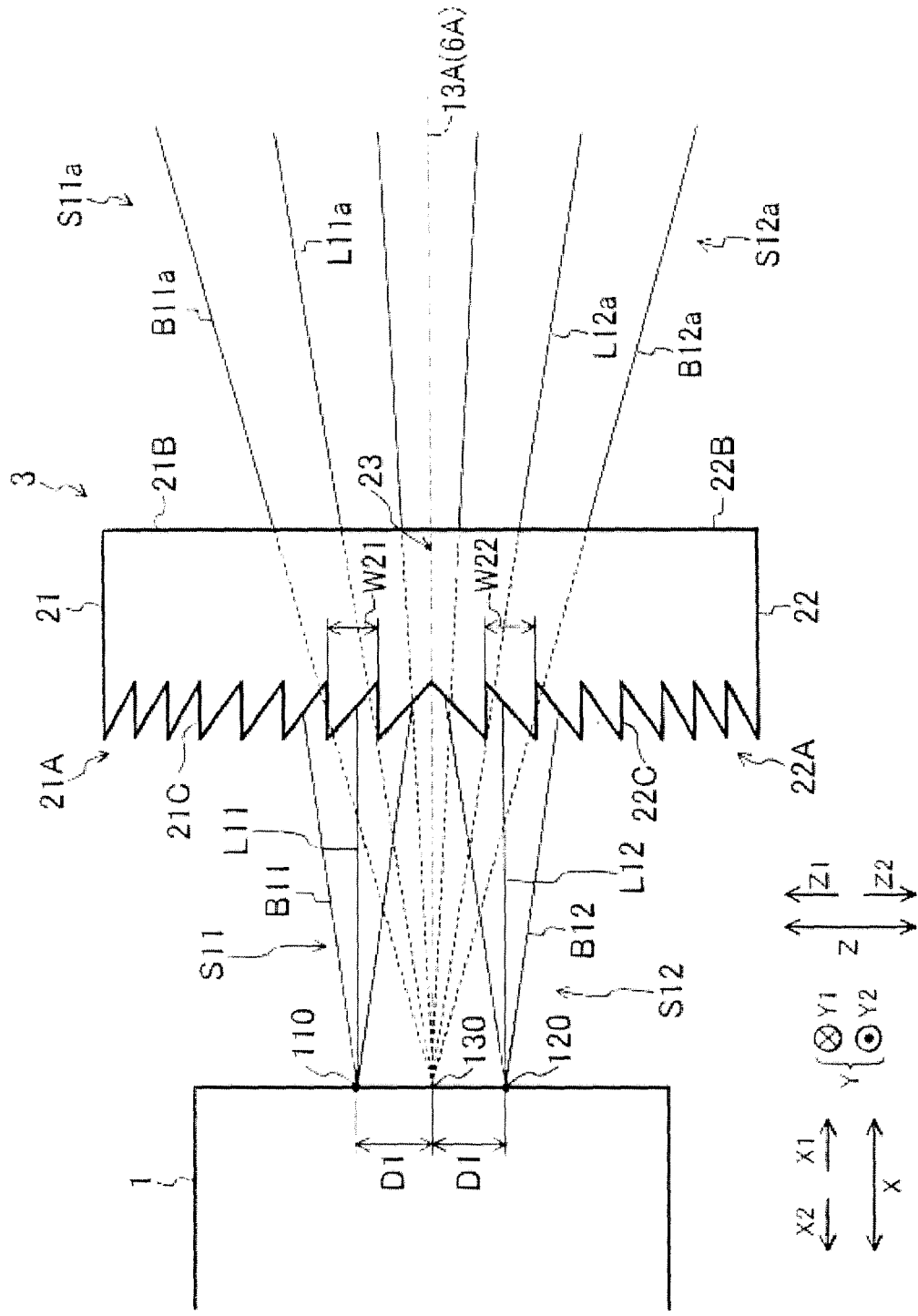
FIG. 15 is an enlarged view of region AR1 in FIG. 14 and a side view of a deflecting element according to one embodiment of the present invention.

As illustrated in FIG. 14 and FIG. 15, the laser light source unit 1 has a first emission point 110 that emits a first laser light B11 (luminous flux S11) and a second emission point 120 that emits a second laser light B12 (luminous flux S12) of an oscillation wavelength identical to that of the first laser light B11 in a position different from that of the first emission point 110. For example, the laser light source unit 1 is a red semiconductor laser chip having an oscillation wavelength band of 640 nm, and the first and second emission points 110, 120 are provided so positions in a Z direction along a chip surface in this semiconductor laser chip are different. By configuring in this manner such that the first and second laser lights B11, B12 are emitted from a single laser light source unit 1, a misalignment in the positions of the emission points 110, 120 due to temperature fluctuation, change over time, or the like can be prevented. In the present embodiment, the first and second emission points 110, 120 have an equal interval D1 from a center of the laser light source unit 1 in the Z direction and are provided on an emission-side end portion of the laser light source unit 1. In FIG. 15, L11 is an optical axis of the luminous flux S11 of the first laser light B11 and L12 is an optical axis of the luminous flux S12 of the second laser light B12.

Note that the positions of the first and second emission points 110, 120 are not limited to the positions of the present embodiment. For example, they are not limited to an equal interval from the center in the Z direction, nor are they limited to the emission-side end portion of the laser light source unit 1. Moreover, emission points 120, 130 do not have to be provided on the same laser-light-emitting element; for example, the two emission points may be respectively provided on different laser-light-emitting elements.

In the present embodiment, a direction in which the first and second laser lights B11, B12 are emitted from the laser light source unit 1 is defined as an X1 direction, and an opposite direction thereof is defined as an X2 direction. Moreover, an X direction (the X1 direction and the X2 direction) is defined to be orthogonal to the Z direction, and a direction orthogonal to the X direction and the Z direction is defined as a Y direction. This is also the case in a ninth example described below.

As illustrated in FIG. 15, the deflecting element 3 receives the first and second laser lights B11, B12 emitted from the laser light source unit 1 and bends and emits respective optical paths so an interval in the Z direction between optical axes of the first and second laser lights B11, B12 gradually widens. The deflecting element 3 has a first diffracting portion 21 that receives the first laser light B11 on one side in the Z direction (Z1-direction side) and a second diffracting portion 22 that receives the second laser light B12 on another side in the Z-direction (Z2-direction side).

Figure 16:
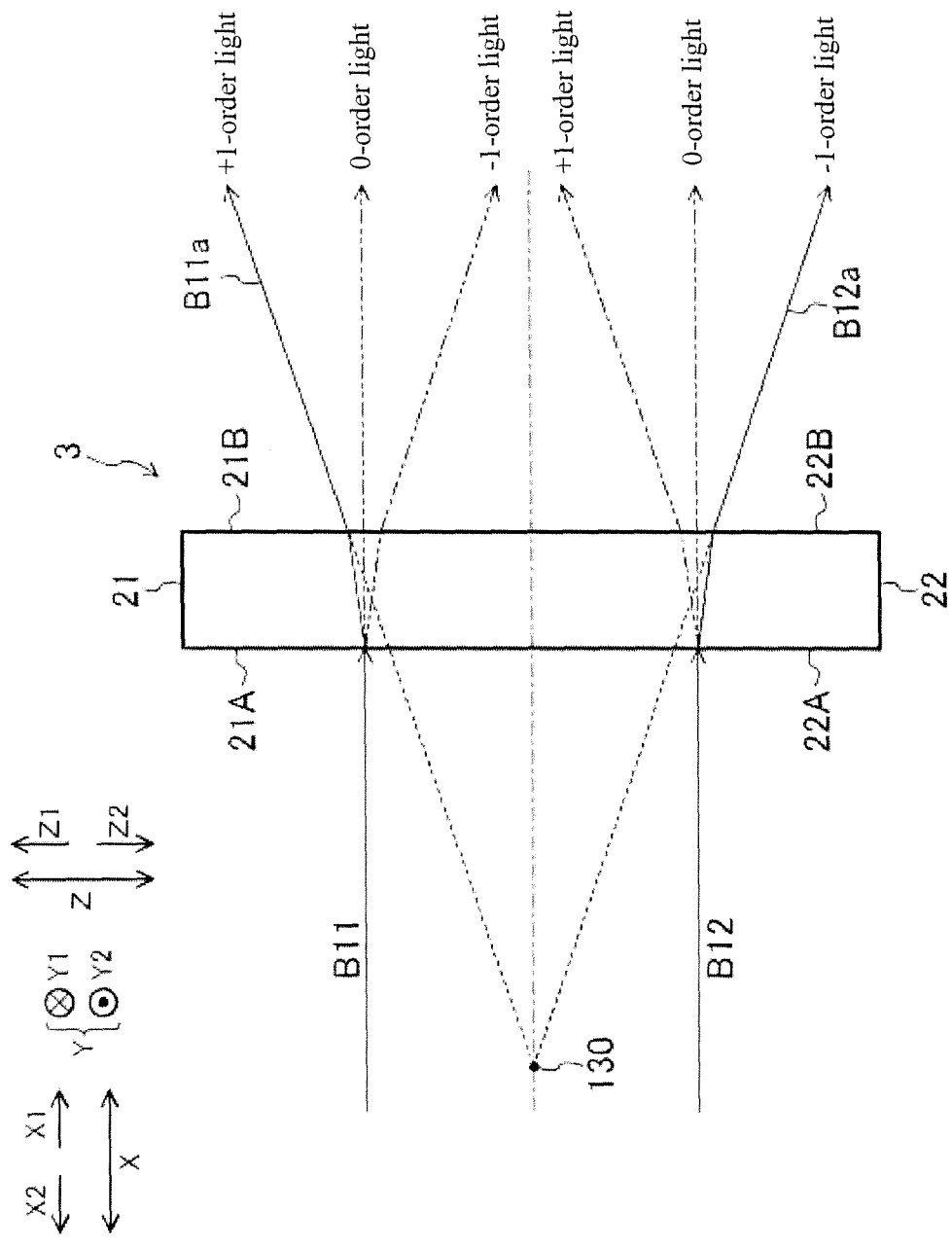
FIG. 16 is a diagram for describing transmission characteristics of the deflecting element.

The first diffracting portion 21 has a first diffracting surface 21A on a light-incidence-surface side opposing the laser light source unit 1 (X2-direction side) and has a first flat surface 21B on a light-emitting side (X1-direction side). The first diffracting surface 21A is formed in the Z direction at a pitch according a wavelength of the first laser light B11 and has a groove portion 21C consisting of a plurality of blazed grooves formed to extend in the Y direction. By the first diffracting surface 21A having the groove portion 21C in this manner, the first laser light B11 become incident to the first diffracting surface 21A is bent in a Z1 direction and emitted as a first laser emitted light B11a (first emitted luminous flux S11a) from the first flat surface 21B upon being bent further. More specifically, the first diffracting portion 21 is configured to not emit a 0-order light and a −1-order light but emit a +1-order light upon transmitting the first laser light B11 (see FIG. 16). In FIG. 15, L11a is an optical axis of the first emitted luminous flux S11a of the first laser emitted light B11a (also referred to as "first optical axis L11a" hereinbelow).

Similarly, the second diffracting portion 22 has a second diffracting surface 22A on a light-incidence-surface side opposing the laser light source unit 1 (X2-direction side) and has a second flat surface 22B on a light-emitting side (X1-direction side). The second diffracting surface 22A is formed in the Z direction at a pitch according a wavelength of the second laser light B12 and has a groove portion 22C consisting of a plurality of blazed grooves formed to extend in the Y direction. In the embodiment of the present example, the groove portion 22C of the second diffracting surface 22A is configured to be a surface object with the first diffracting portion 21 with a boundary surface 23 between the first diffracting portion 21 and the second diffracting portion as reference. By the second diffracting surface 22A having the groove portion 22C in this manner, the second laser light B12 (luminous flux S12) become incident to the second diffracting surface 22A is bent in a Z2 direction, further bent at the second flat surface 22B, and emitted as a second laser emitted light B12a (second emitted luminous flux S12a). More specifically, the second diffracting portion 22 is configured to not emit a 0-order light and a +1-order light but emit a −1-order light upon transmitting the second laser light B12 (see FIG. 16). In FIG. 15, L12a is an optical axis of the second emitted luminous flux S12a of the second laser emitted light B12a (also referred to as "second optical axis L12a" hereinbelow).

Such a configuration enables a virtual image of a light source of the first emitted luminous flux S11a emitted from the first diffracting portion 21 and a virtual image of a light source of the second emitted luminous flux S12a emitted from the second diffracting portion 22 to overlap at the virtual image emission point 130. The virtual image emission point 130 is formed on a first-and-second-emission-points 110, 120 side (X2-direction side) of the first and second diffracting surfaces 21A, 22A. 13A is an optical axis of a virtual-image laser light emitted from the virtual image emission point 130.

Returning to FIG. 14, the collimating lens 2 makes the luminous fluxes emitted from the deflecting element 3 parallel luminous fluxes and emits these to the biaxial MEMS mirror 4. More specifically, the collimating lens 2 is disposed so an optical center axis 6A thereof overlaps the optical axis 13A of the virtual emission point 130 and makes the luminous fluxes S11, S12 emitted from the first and second emission points 110, 120 parallel luminous fluxes parallel to the optical center axis 6A as luminous fluxes of the same family. The parallel luminous fluxes emitted from the collimating lens 2 are converted into a loose convergent light by a lens for converging (not illustrated) and afterward reflected by the biaxial MEMS mirror 4 so an image is projected on the screen 5 surface.

As above, according to the embodiment of the present example, synthesis can be performed such that it is as if luminous fluxes of laser lights emitted from two emission points are being emitted from one emission point (for example, the virtual image emission point 130). Here the deflecting element 3 according to the embodiment of the present example matches the virtual images of the light sources by deflecting so an angle between the first optical axis L11a of the first emitted luminous flux S11a and the second optical axis L12a of the second emitted luminous flux S12a gradually widens. By this, the laser light B11 emitted from the first emission point 110 and the laser light B12 emitted from the second emission point 120 can be synthesized even if these are laser lights having identical polarization planes.

Figure 17A:
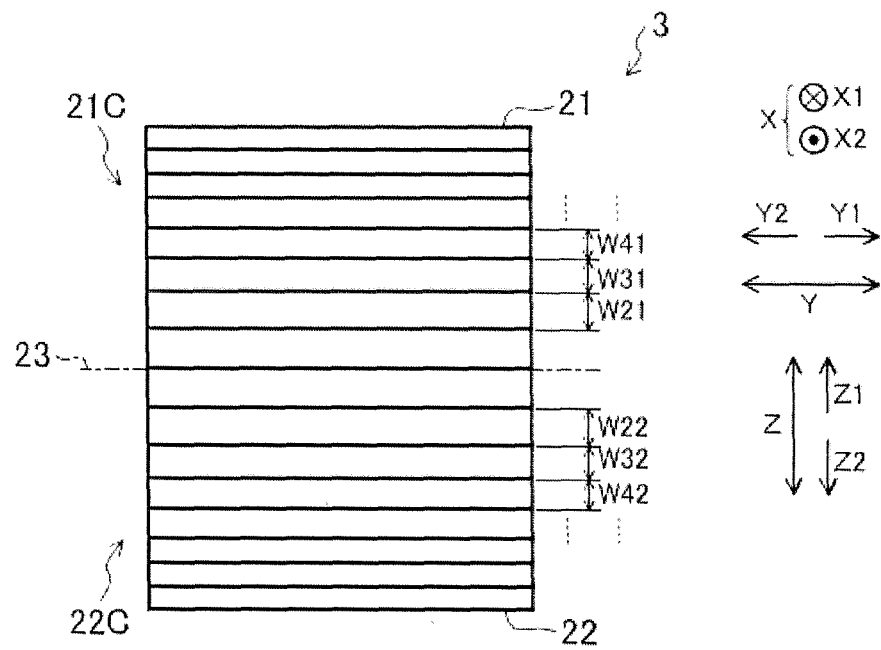
FIG. 17A is a plan view of a deflecting element according to one embodiment of the present invention.

Note that as illustrated in FIG. 15 and FIG. 17A, in the embodiment of the present example, the pitch of the groove portion 21C of the first diffracting surface 21A is configured to gradually narrow from W21 to W31 and then to W41 heading in the Z1 direction with the boundary surface 23 between the first diffracting portion 21 and the second diffracting portion 22 as reference. Similarly, the pitch of the groove portion 22C of the second diffracting surface 22A is configured to gradually narrow from W22 to W32 and then to W42 heading in the Z2 direction with the boundary surface 23 between the first diffracting portion 21 and the second diffracting portion 22 as reference. By this, at the same time as diffracting the laser lights in predetermined directions by the diffracting surfaces, an aberration arising due to diffraction of the first and second diffracting portions 21, 22 can be corrected.

Note that the pitches of the groove portions 21C, 22C of the first and second diffracting surfaces 21A, 22A are not limited to the above. For example, in a situation where a semiconductor laser per se corrects an aberration had thereby, how the pitches of the groove portions are varied differs from FIG. 17A (not illustrated). Moreover, in a situation where no correction of an aberration is needed, the pitches of the groove portions 21C, 22C of the first and second diffracting surfaces 21A, 22A respectively become predetermined pitches according to the wavelengths of the first and second laser lights B11, B12 (for example, fixed at W21, W22).

Figure 17B:
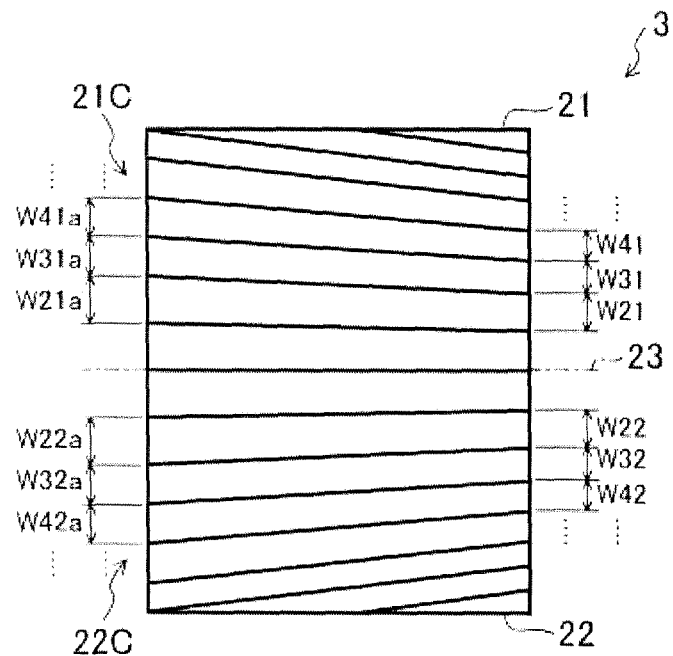
FIG. 17B is a plan view of a deflecting element according to one embodiment of the present invention.

Furthermore, as illustrated in FIG. 17B, a configuration may be such that groove widths of the groove portions 21C, 22C of the first and second diffracting surfaces 21A, 22A gradually change in the Y direction. FIG. 17B illustrates an example where the groove width of the groove portion 21C of the first diffracting surface 21A gradually changes from W21, W31, W41, . . . at an end portion in a Y1 direction to W21a, W31a, W41a, . . . at an end portion in a Y2 direction. Similarly, it illustrates an example where the groove width of the groove portion 22C of the second diffracting surface 22A gradually changes from W22, W32, W42, . . . at the end portion in the Y1 direction to W22a, W32a, W42a, . . . at the end portion in the Y2 direction. In FIG. 17B, a configuration is such that in a situation where the groove widths are, for example, W21, W31, W41, . . . , efficiency is optimal at an oscillation wavelength of 670 nm and in a situation where the groove widths are W21a, W31a, W41a, efficiency is optimal at an oscillation wavelength of 640 nm. Note that FIG. 17B illustrates an example where all groove widths gradually change, but a configuration may be such that included are diffracting grooves where a portion of the groove widths gradually changes.

Figure 25:
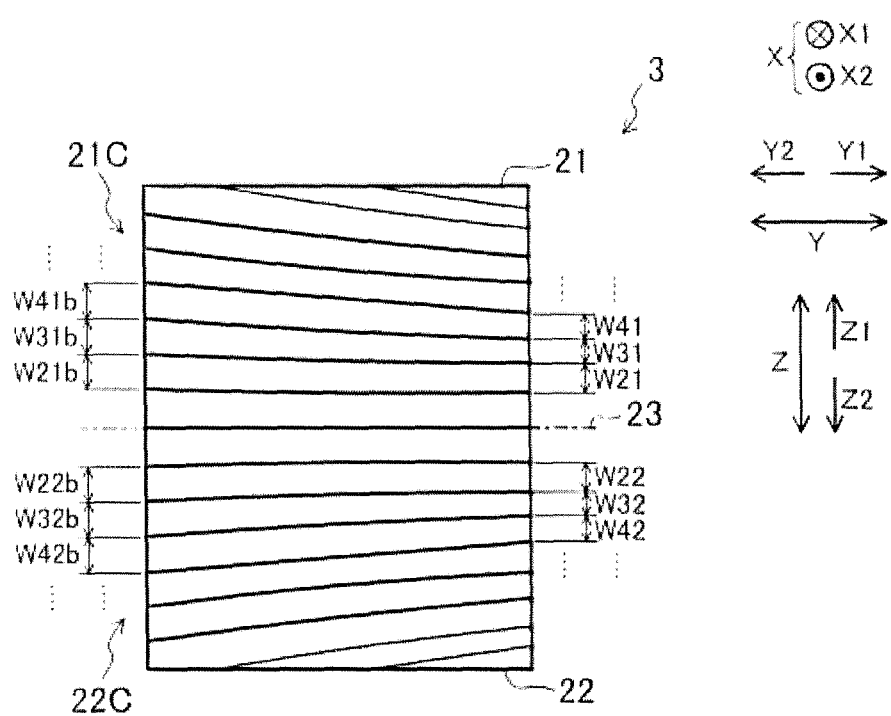
FIG. 25 is a plan view illustrating another example of a deflecting element according to one embodiment of the present invention.

Furthermore, change in the groove widths does not need to be rectilinear; for example, as illustrated in FIG. 25, the groove width of the groove portion 21C of the first diffracting surface 21A may change curvilinearly from W21, W31, W41, . . . at the end portion in the Y1 direction to W21b, W31b, W41b, . . . at the end portion in the Y2 direction. Similarly, the groove width of the groove portion 22C of the second diffracting surface 22A may gradually change from W22, W32, W42, . . . at the end portion in the Y1 direction to W22b, W32b, W42b, . . . at the end portion in the Y2 direction. By the groove widths changing curvilinearly in this manner, a function of beam shaping can be incorporated into the deflecting element 3. Moreover, by changing a relative position between a beam spot formed in a first-and-second-diffracting-surfaces 21A, 22A shape and the laser light source unit 1, when implementing a design that adjusts the pitches of the groove portions 21C, 22C, a relationship of average pitches used in the spot relative to a position change amount can be set freely, from linear to curvilinear.

Figure 18:
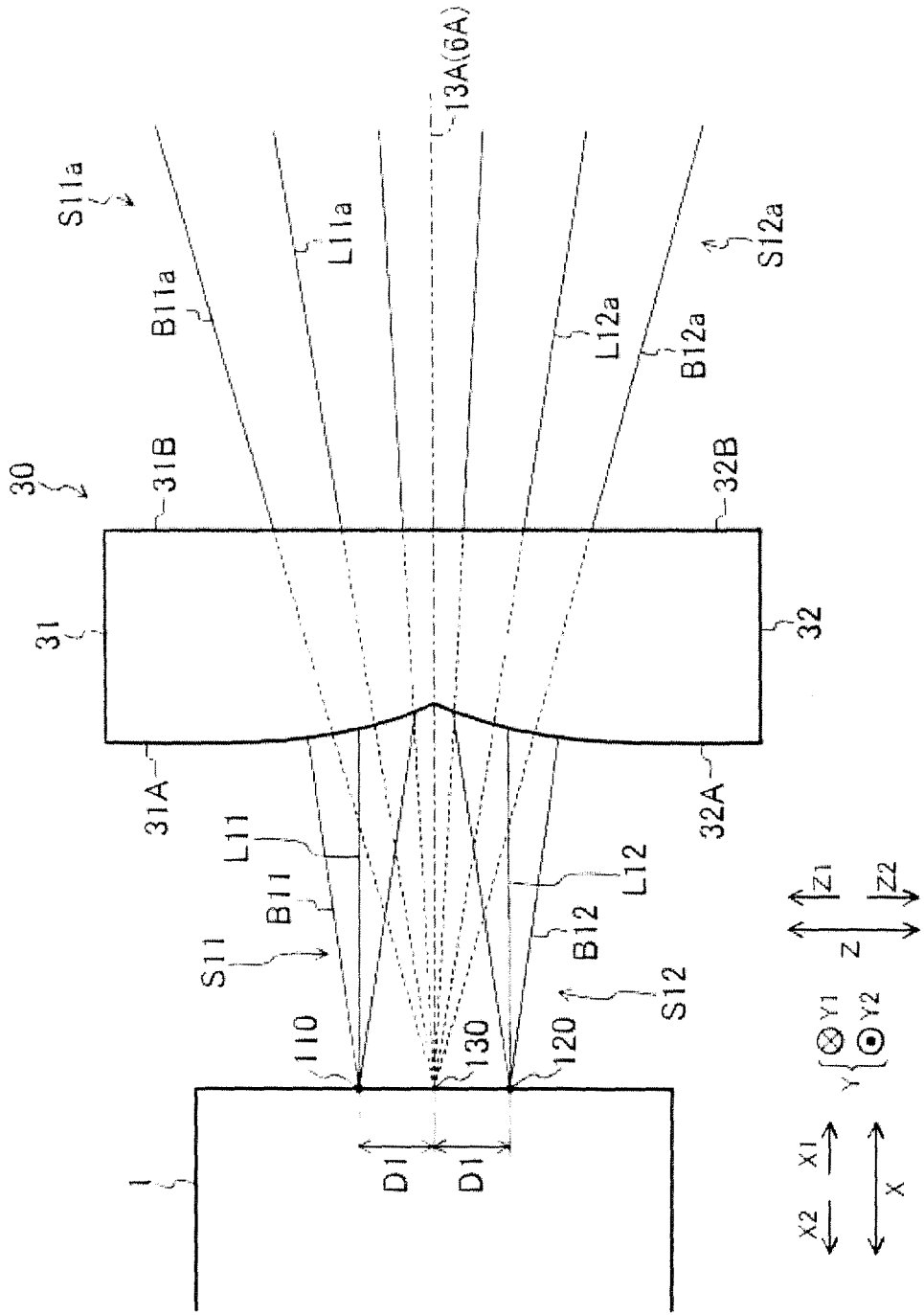
FIG. 18 is a side view of a deflecting element according to one embodiment of the present invention.

Furthermore, in the embodiment of the present example, the deflecting element 3 is made to be an optical element of a diffractive type but is not limited thereto. For example, as illustrated in FIG. 18, an optical element of a refractive type may be applied as the deflecting element. As the optical element of the refractive type, there is, for example, a prism, which is described in detail using FIG. 18 in the ninth example below.

Ninth Example

FIG. 18 is a conceptual diagram illustrating a configuration of a laser optical device 200 according to one embodiment of the present invention. Note that components other than a laser optical device 200 of an image projection device 100 are in common with those in FIG. 14 (the embodiment of the eighth example); in the present example, illustration and detailed description thereof may be omitted.

As illustrated in FIG. 18, a deflecting element 30 receives first and second laser lights B11, B12 emitted from a laser light source unit 1 and bends and emits respective optical paths so an interval in a Z direction between optical axes of the first and second laser lights B11, B12 gradually widens. The deflecting element 30 has a first refracting portion 31 that receives the first laser light B11 on one side in the Z direction (Z1-direction side) and a second refracting portion 32 that receives the second laser light B12 on another side in the Z direction (Z2-direction side).

The first refracting portion 31 has a first refracting surface 31A on a light-incidence-surface side opposing the laser light source unit 1 (X2-direction side) and has a first flat surface 31B on a light-emitting side (X1-direction side). The first refracting surface 31A is a refracting surface that refracts a luminous flux S11 of the first laser light B11 and is configured so the first laser light B11 (luminous flux S11) is bent in a Z1 direction and emitted as a first laser emitted light B11a (first emitted luminous flux S11a) from the first flat surface 31B upon being bent further (see FIG. 16).

Similarly, the second refracting portion 32 has a second refracting surface 32A on a light-incidence-surface side opposing the laser light source unit 1 (X2-direction side) and has a second flat surface 32B on a light-emitting side (X1-direction side). The second refracting surface 32A is a refracting surface that refracts a luminous flux S12 of the second laser light B12 and is configured so the second laser light B12 (luminous flux S12) is bent in a Z2 direction and emitted as the first laser emitted light B11a (first emitted luminous flux S11a) from the second flat surface 32B upon being bent further (see FIG. 16).

Such a configuration enables a virtual image of a light source of the luminous flux S11a emitted from the first refracting portion 31 and a virtual image of a light source of a luminous flux S12a emitted from the second refracting portion 32 to overlap at a virtual image emission point 130. The virtual image emission point 130 is formed on a first-and-second-emission-points 110, 120 side (X2-direction side) of the first and second refracting surfaces 31A, 32A. 13A is an optical axis of a virtual-image laser light emitted from the virtual image emission point 130.

By configuring the deflecting element 30 as above, an optical element of a refractive type can be applied as the deflecting element according to the present disclosure. That is, in the embodiment of the present example as well, synthesis can be performed such that it is as if luminous fluxes of laser lights emitted from two emission points are being emitted from one emission point (for example, the virtual image emission point 130). In the embodiment of the present example as well, the virtual images of the light sources are matched by refracting so an angle between a first optical axis L11a of the first emitted luminous flux S11a and a second optical axis L12a of the second emitted luminous flux S12a gradually widens. By this, the laser light B11 emitted from the first emission point 110 and the laser light B12 emitted from the second emission point 120 can be synthesized even if these are laser lights having identical polarization planes.

In the embodiments of the first and second examples, the deflecting elements 3, 30 of the transmissive type are described as the deflecting element; however, a diffraction grating of a reflective type can also be applied as the deflecting element. Details thereof are described in a tenth example below.

Tenth Example

FIG. 19A to FIG. 21 are conceptual diagrams illustrating a configuration of a laser optical device 200 and a deflecting element 40 according to one embodiment of the present invention. Note that components other than a laser optical device 200 of an image projection device 100 are in common with those in FIG. 14 (the embodiment of the eighth example); in an embodiment of the present example, illustration and detailed description thereof may be omitted.

Similarly to the embodiment of the eighth example, a laser optical device 200 according to the embodiment of the present example is provided with a laser light source unit 1 as a laser generation unit, the deflecting element 40, and a collimating lens 2. Moreover, laser lights are emitted from different emission points of the laser light source unit 1 and, after reflecting these laser lights by the deflecting element 40 and matching virtual images of light sources of reflected luminous fluxes, made parallel lights and output by the collimating lens 2.

In the embodiment of the present example, a direction in which first and second laser lights B11, B12 are emitted from the laser light source unit 1 is defined as a Z1 direction and an opposite direction thereof is defined as a Z2 direction. Moreover, a travel direction of the luminous fluxes reflected at the deflecting element 40 is defined as an X1 direction, and an opposite direction thereof is defined as an X2 direction. Moreover, an X direction (the X1 direction and the X2 direction) and a Z direction (the Z1 direction and the Z2 direction) are defined to be orthogonal, and a direction orthogonal to the X direction and the Z direction is defined as a Y direction.

The deflecting element 40 receives the first and second laser lights B11, B12 emitted in the Z1 direction from the laser light source unit 1 and reflects the first and second laser lights B11, B12 so optical axes of the reflected luminous fluxes bend to an X1-direction side. At this time, the first and second laser lights B11, B12 are emitted with respective optical paths bent so an angle between an optical axis L11b of a reflected luminous flux S11b as a first emitted luminous flux and an optical axis L12b of a reflected luminous flux S12b as a second emitted luminous flux widens, the first emitted luminous flux and the second emitted luminous flux being the reflected luminous fluxes of the first and second laser lights B11, B12. Note that in FIG. 19 to FIG. 21, B11b and B12b are respectively reflected lights of the first and second laser lights B11, B12.

Specifically, the deflecting element 40 has a first reflecting portion 41 that receives the first laser light B11 on one side in the Y direction (Y1-direction side) and a second reflecting portion 42 that receives the second laser light B12 on another side in the Y direction (Y2-direction side).

The first reflecting portion 41 has a first reflecting surface 41A on a light-incidence-surface side (Z2-direction side) of the first laser light B11, which is emitted from a first emission point 110. The first reflecting surface 41A is inclined 45 degrees relative to an optical axis L11 of the first laser light B11. Moreover, the first reflecting surface 41A is inclined so the optical axis of the reflected luminous flux S11b gradually widens in a Y1 direction in this state of being inclined 45 degrees.

The second reflecting portion 42 has a second reflecting surface 42A on a light-incidence-surface side (Z2-direction side) of the second laser light B12, which is emitted from a second emission point 120. The second reflecting surface 42A is inclined 45 degrees relative to an optical axis L12 of the second laser light B12. Moreover, the second reflecting surface 42A is inclined so the optical axis of the reflected luminous flux S12b gradually widens in a Y2 direction in this state of being inclined 45 degrees.

Such a configuration enables a virtual image of a light source of the reflected luminous flux S11b reflected by the first reflecting portion 41 and a virtual image of a light source of the reflected luminous flux S12b emitted from the second reflecting portion 42 to overlap at a virtual image emission point 130. The virtual image emission point 130 is formed on an opposite side of a travel direction of the reflected luminous fluxes S11b, S12b (X2-direction side) of the first and second reflecting surfaces 41A, 42A.

By configuring the deflecting element 40 as above, an optical element of a reflective type can be used as the deflecting element according to the present disclosure. That is, in the embodiment of the present example as well, synthesis can be performed such that it is as if luminous fluxes of laser lights emitted from two emission points are being emitted from one emission point. In the embodiment of the present example as well, the virtual images of the light sources are matched by reflecting so an angle between the first optical axis L11b of the reflected luminous flux S11b and the second optical axis L12b of the reflected luminous flux S12b gradually widens. By this, the laser light B11 emitted from the first emission point 110 and the laser light B12 emitted from the second emission point 120 can be synthesized even if these are laser lights having identical polarization planes.

In the eighth to tenth embodiments above, examples of an image projection device of a single color are illustrated; however, similar effects can be obtained even if the laser lights emitted from the two emission point of the laser light source unit 1 are laser lights of different oscillation wavelengths. For example, similar effects can be obtained even in a situation where a red laser (for example, an oscillation wavelength of 660 nm) is emitted from the first emission point 110 and a green laser (for example, an oscillation wavelength of 520 nm) is emitted from the second emission point 120. Moreover, a plurality of laser-light-emitting elements may be used so the image projection device 100 can display a plurality of colors. Details thereof are described in an embodiment of an eleventh example below.

Eleventh Example

Figure 22:
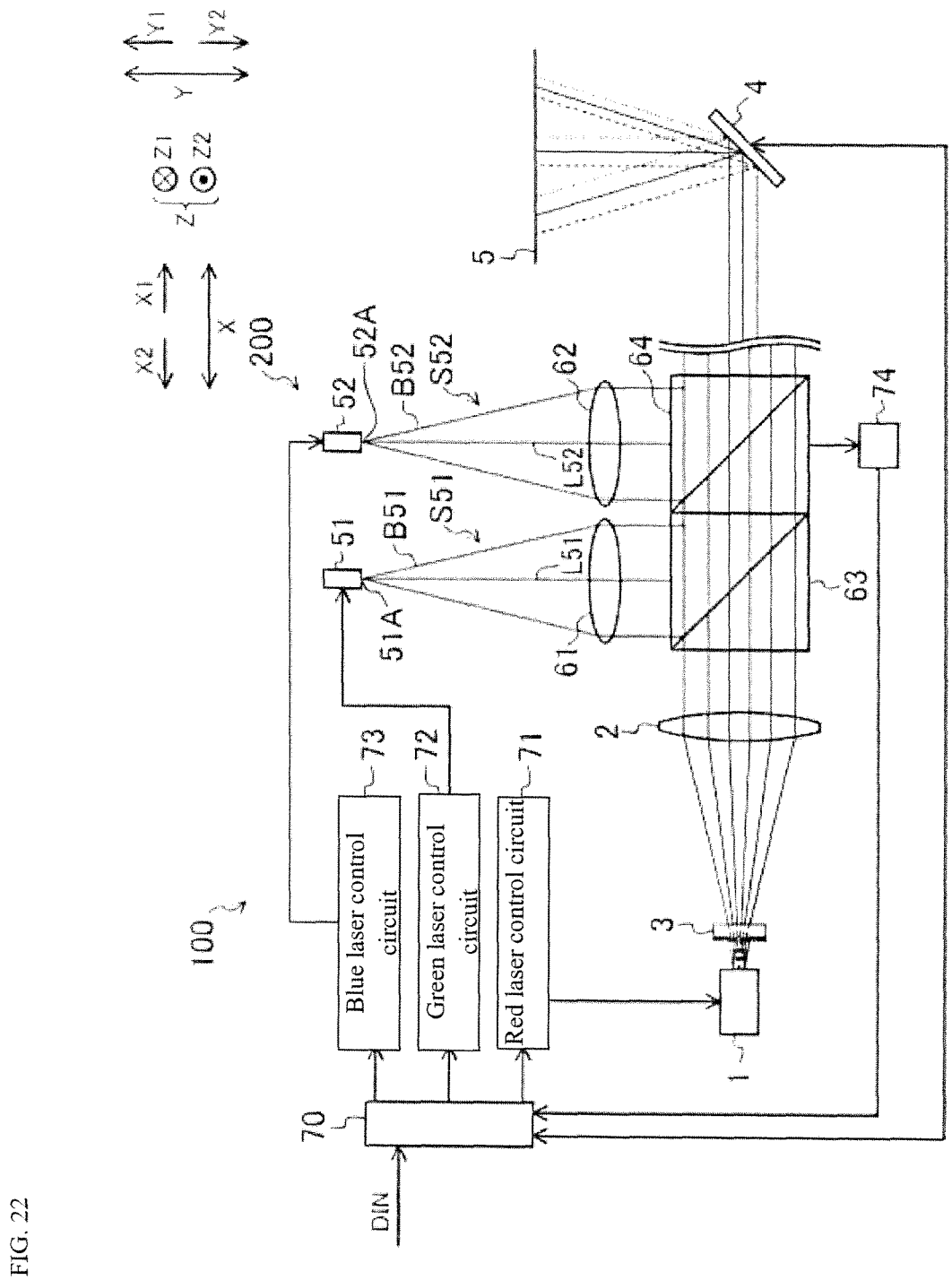
FIG. 22 is a schematic view illustrating a configuration of an image projection device according to one embodiment of the present invention.

FIG. 22 is a conceptual diagram illustrating an image projection device 100 according to one embodiment of the present invention and principally illustrates components relating to a laser optical device 200, similarly to the illustration of the image projection device 100 according to the embodiment of example 8. In FIG. 22, components in common with those in FIG. 14 are labeled with reference signs identical to those in FIG. 14, and here, detailed description thereof may be omitted.

In a configuration of FIG. 22, a laser light source unit 1 is a red laser (for example, an oscillation wavelength of 640 nm). A deflecting element 3 is configured so a maximum refraction efficiency is obtained at the oscillation wavelength of the red laser, and a collimating lens 2 is optimized to the oscillation wavelength of the red laser.

A laser light source unit 51 is a green laser (oscillation wavelength of 520 nm) and is a laser element having a single emission point. Similarly, a laser light source unit 52 is a blue laser (for example, an oscillation wavelength of 450 nm) and is a laser element having a single emission point. 51A is the emission point of the laser light source unit 51, and 52A is the emission point of the laser light source unit 52.

A laser light B51 emitted from the laser light source unit 51 (luminous flux S51) is made incident to a dichroic prism 63 after being converted into a parallel light parallel to an optical axis L51 of the luminous flux S51 by a collimating lens 61. The dichroic prism 63 is configured to transmit a laser light of the oscillation wavelength of the red laser and reflect a laser light of the oscillation wavelength of the green laser. By this, laser lights emitted from the laser light source unit 1 and the laser light source unit 51 are emitted as a single synthetic laser light after being transmitted through/reflected by the dichroic prism 63.

Similarly, a laser light B52 emitted from the laser light source unit 52 (luminous flux S52) is made incident to a dichroic prism 64 after being converted into a parallel light parallel to an optical axis L52 of the luminous flux S52 by a collimating lens 62. The dichroic prism 64 is configured to transmit laser lights of the oscillation wavelength of the red laser and the oscillation wavelength of the green laser and reflect a laser light of the oscillation wavelength of the blue laser. By this, the laser light emitted from the dichroic prism 63 and a laser light emitted from the laser light source unit 52 are emitted to a biaxial MEMS mirror 4 as a single synthetic laser light after being transmitted through/reflected by the dichroic prism 64.

An intensity of the green laser light emitted from the laser light source unit 51 is controlled by a green laser control circuit 72. Similarly, an intensity of the blue laser light emitted from the laser light source unit 52 is controlled by a blue laser control circuit 73. A control IC 70 receives image data DIN such as video data and sends to the red laser control circuit 71, the green laser control circuit 72, and the blue laser control circuit 73 data that is converted into intensity based on this image data DIN. 74 is a photodetector and senses a brightness and an optical-axis misalignment of each laser element based on the synthetic laser light synthesized by the dichroic prism 64.

The control IC 70 controls two-dimensional scanning by the biaxial MEMS mirror 4 and, based on a sensing result by the photodetector 74, adjusts light-emission intensities and corrects a position misalignment of the optical axes of the laser lights emitted from the emission points 110, 120, 51A, and 52A. The above position shifting of the optical axes is realized by, for example, the control IC 70 receiving the image data DIN and adjusting timings of emission of the laser lights emitted from the emission points according to this image data DIN.

Figure 23A:
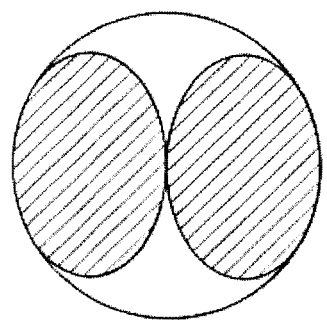
FIG. 23A is a diagram for describing an aperture stop of the image projection device according to one embodiment of the present invention.
Figure 23B:
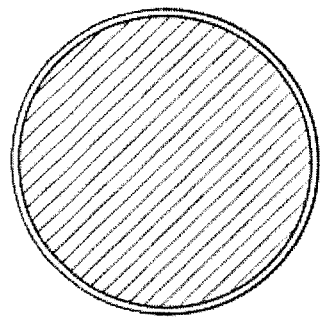
FIG. 23B is a diagram for describing an aperture stop of the image projection device according to one embodiment of the present invention.
Figure 23C:
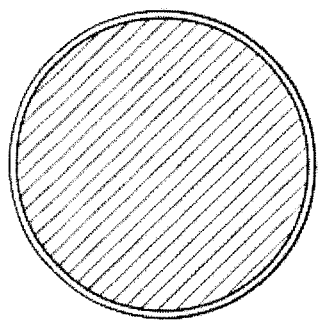
FIG. 23C is a diagram for describing an aperture stop of the image projection device according to one embodiment of the present invention.

In the embodiment of the present example, an intensity distribution of the red laser transmitted through the collimating lens 2 (see FIG. 23A) may differ from intensity distributions of an intensity distribution of the green laser transmitted through the collimating lens 61 (see FIG. 23B) and the intensity distribution of the green laser transmitted through the collimating lens 61 (see FIG. 23C). Therefore, as illustrated in FIG. 23A, in the laser light source unit 1, it is preferable to adjust an aspect ratio between a spreading angle in a horizontal direction and a spreading angle in a vertical direction of laser light emission of the laser light source unit 1 to spread to full aperture. By this, a maximum light usage efficiency relative to the aperture can be obtained, and a parallel light of a higher RIM intensity can be obtained. Note that the aspect ratio above can be adjusted by, for example, emission angles of the laser lights. Moreover, an aspect ratio after aperture stopping of the laser light source unit 1 is preferably set to, for example, between 1:1 and 1:2. However, the aspect ratio is not limited to the values above and may be other setting values. Moreover, diffraction angles of first and second diffracting surfaces 21A, 22A of the deflecting element 3 may be set so two spots in the intensity distribution of the red laser transmitted through the collimating lens 2 (see FIG. 23A) overlap on a screen 5 surface.

Figure 19A:
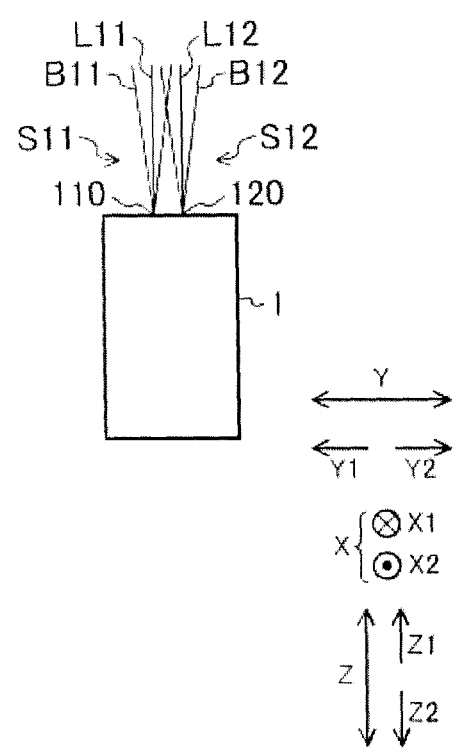
FIG. 19A is a side view of a laser light source unit according to one embodiment of the present invention.
Figure 19B:
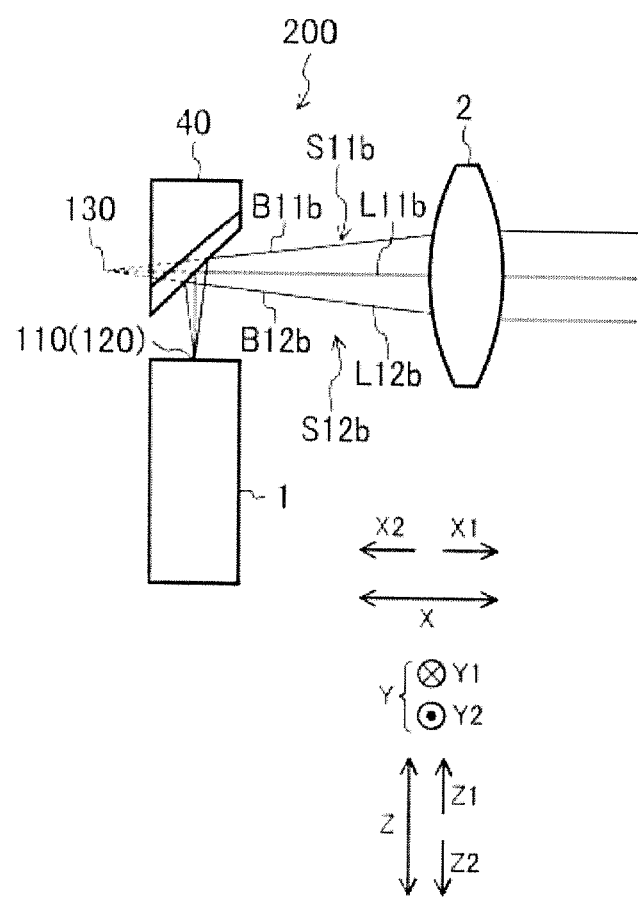
FIG. 19B is a side view of the laser light source unit, a deflecting element, and a collimating lens according to one embodiment of the present invention.
Figure 20:
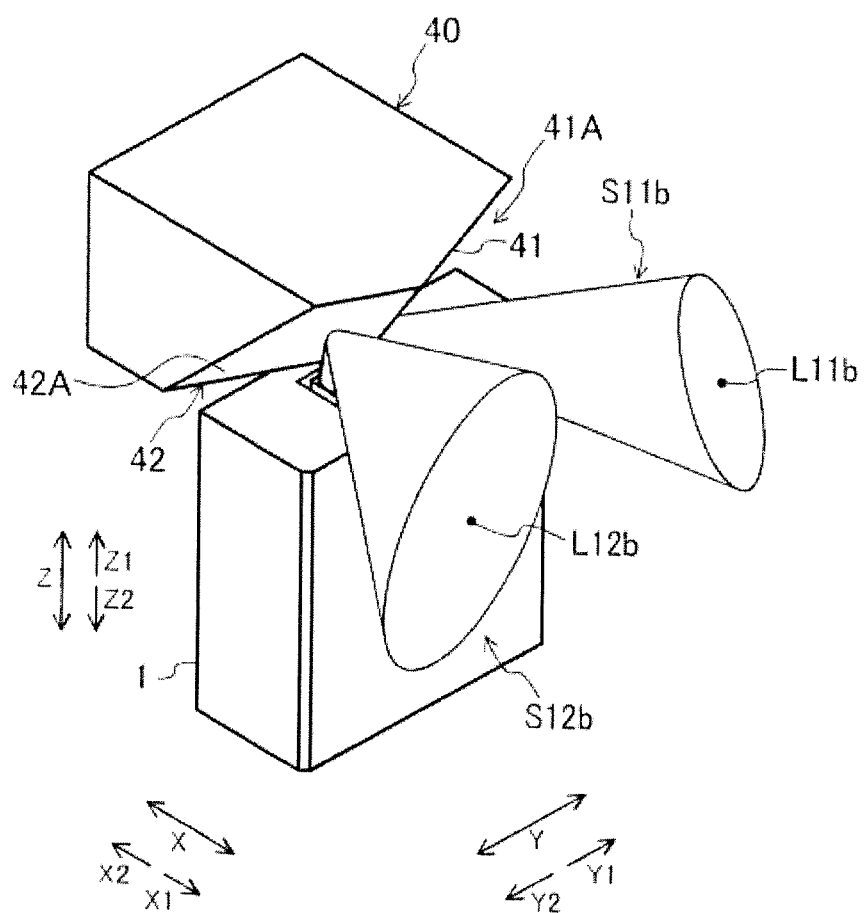
FIG. 20 is a perspective view for describing a configuration of the deflecting element according to one embodiment of the present invention.
Figure 21:
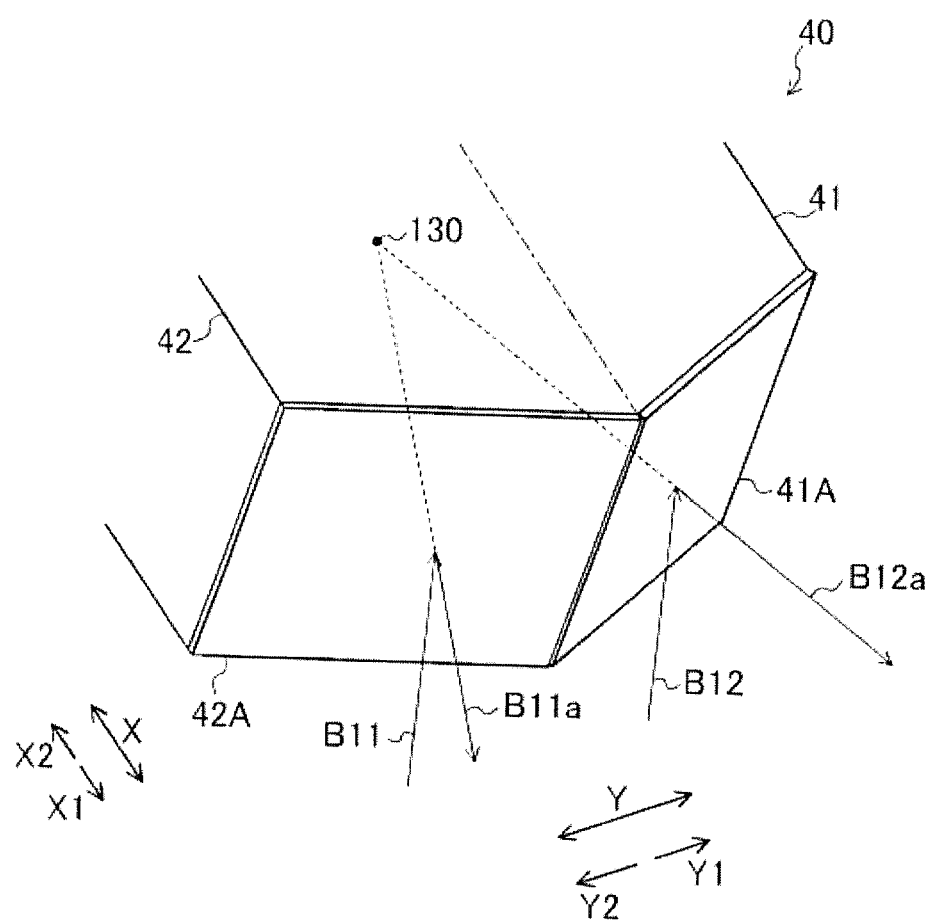
FIG. 21 is a perspective view for describing reflection characteristics of a light of the deflecting element according to one embodiment of the present invention.

Note that in FIG. 22, illustrated is an example where an optical element of a diffractive type is applied as the deflecting element applied to the laser optical device, but this is not limited thereto; similar effects can be obtained even if an optical element of a refractive type such as that illustrated in FIG. 18 or an optical element of a reflective type such as that illustrated in FIGS. 19A, 19B is applied.

Modified Examples

Note that in the embodiment of the eighth example, the red semiconductor laser of the laser light source unit 1 can use, for example, a compound semiconductor crystal of AlGaInP (aluminum-gallium-indium-phosphate). It is known that due to characteristics of this crystal each time a temperature of the laser light source unit 1 increases 1° C. the oscillation wavelength shifts about 0.2 nm to a long-wavelength side. Moreover, with the deflecting element 3, efficiencies of ±1-order lights are determined by wavelengths of light rays that become incident to depths of the groove portions 21C, 22C of the first and second diffracting surfaces 21A, 22A. In a general semiconductor laser, as a temperature of a temperature of a semiconductor chip increases, a light-emission power decreases. Because of this, the laser light source unit 1 may be designed so an efficiency of the deflecting element 3 is maximized at a maximum temperature in actual use. By this, there is a merit where this efficiency can be improved with regard to a minimum light-emission brightness in a range of a usage environment temperature.

Figure 24:
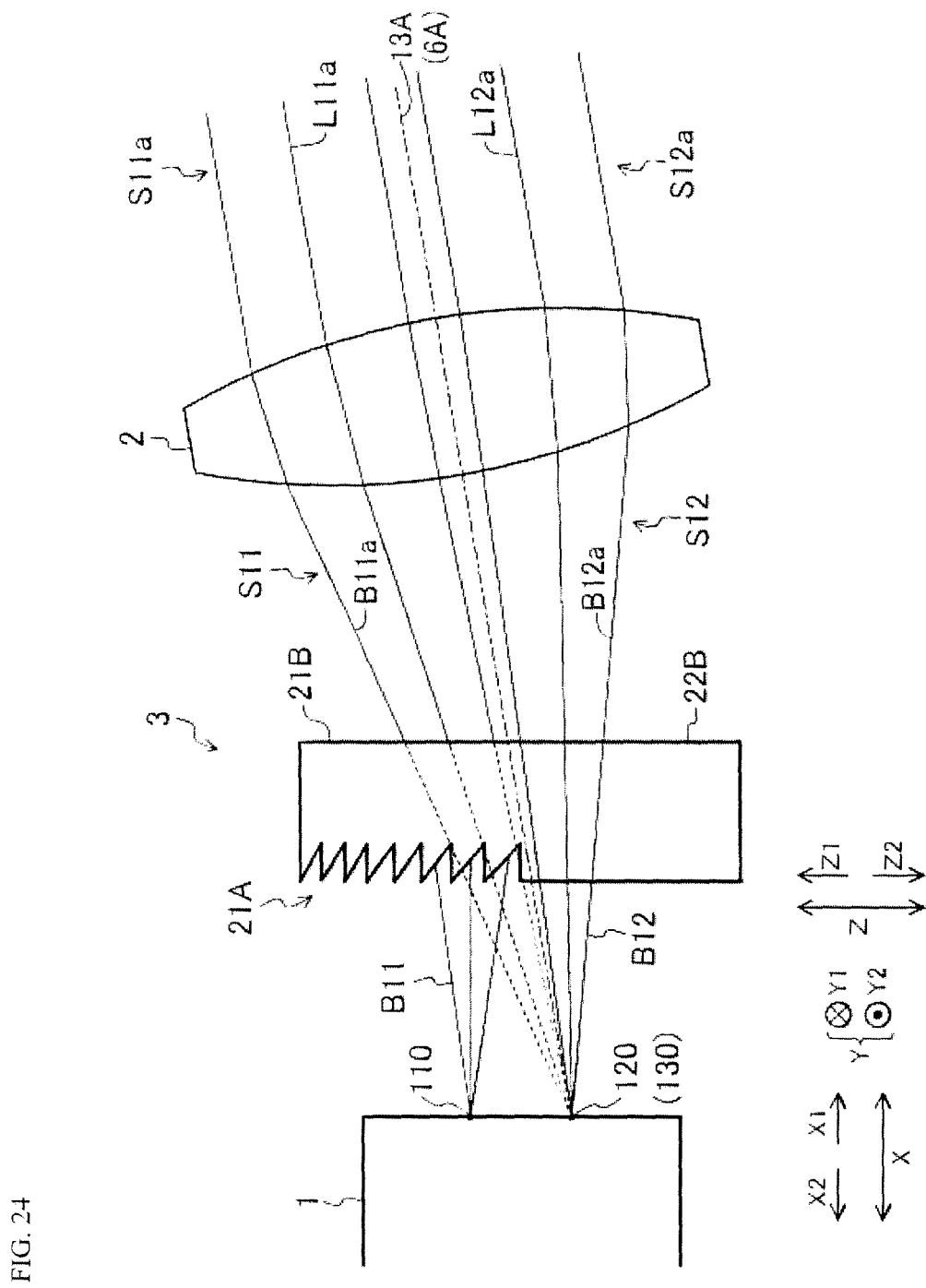
FIG. 24 is a side view illustrating another example of the deflecting element according to one embodiment of the present invention.

Furthermore, in the embodiment of the eighth example, an example is described where the deflecting element 3 has the two diffracting portions of the first diffracting portion 21 and the second diffracting portion 22, but this is not limited thereto; for example, the first diffracting surface 22A of the first diffracting portion 21 or the second diffracting surface 22A of the second diffracting portion 22 may be replaced with a flat surface. That is, in the embodiment of the eighth example, a configuration may be adopted where the first diffracting portion 21 or the second diffraction portion 22 is omitted from the deflecting element 3. FIG. 24 illustrates an example where in the configuration of FIG. 15 the second diffracting surface 22A is replaced with a flat surface. In this situation as well, the virtual image of the light source of the first emitted luminous flux S11a emitted from the first diffracting portion 21 and the virtual image of the light source of the second emitted luminous flux S12a emitted from the flat surface 22B overlap at the virtual image emission point 130. That is, effects similar to those of the embodiment of the eighth example are obtained. While not illustrated, similarly to the above, in the embodiment of the ninth example, a configuration may be adopted where the first refracting portion 31 or the second refracting portion 32 is omitted; in this situation as well, effects similar to those of the embodiment of the ninth example are obtained.

Furthermore, in the embodiment of the eleventh example above, the laser light source units 51, 52 are made to be laser elements having a single emission point, but this is not limited thereto. For example, the laser light source unit 51 and/or the laser light source unit 52 may be made to have a plurality of emission points. In this situation, it is favorable to provide the diffraction grating according to the embodiments of the eighth to tenth examples between the laser light source unit 51 and the collimating lens 61 and/or the laser light source unit 52 and the collimating lens 62. Moreover, in each embodiment above, the laser light source unit 1 is described as having two emission points, but this is not limited thereto. For example, the laser light source unit 1 may have three or more emission points.

Example of Disposition of Deflecting Element

Figure 26:
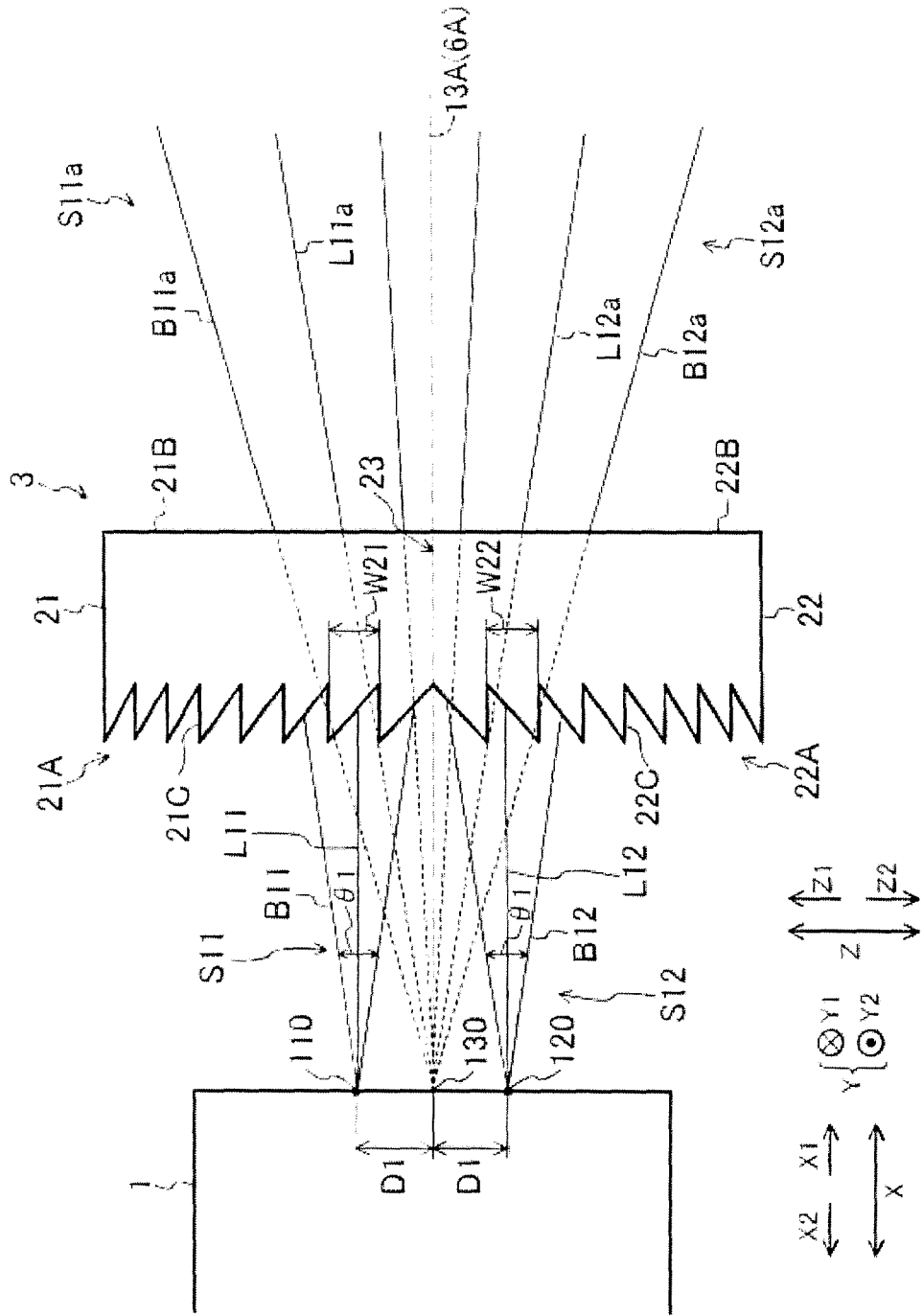
FIG. 26 is a plan view illustrating an example of disposition of the deflecting element according to one embodiment of the present invention.
Figure 27:
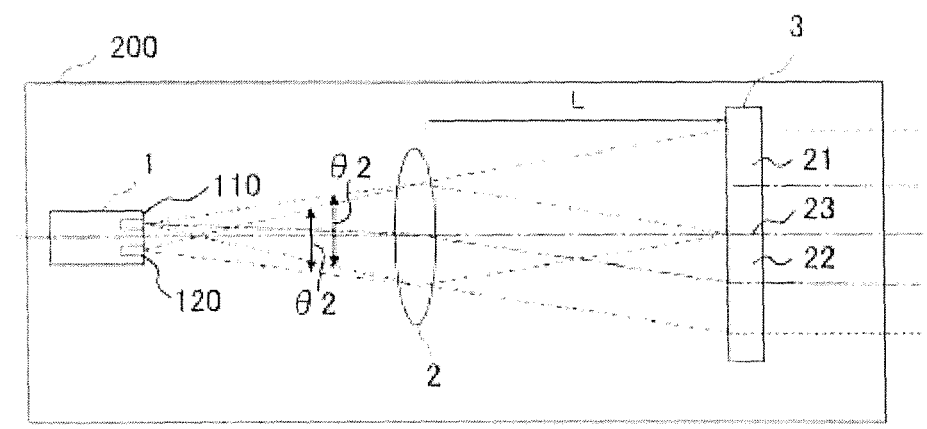
FIG. 27 is a plan view illustrating an example of disposition of the deflecting element according to one embodiment of the present invention.

FIG. 26 and FIG. 27 illustrate an example of a disposition of the deflecting element in the embodiments of the examples described above.

FIG. 26 represents a physical positional relationship of components in a configuration where the deflecting element 3 is disposed between the laser light source unit 1 and the collimating lens 2 as illustrated in the eighth example, the ninth example, and the like described above.

Figure 28:
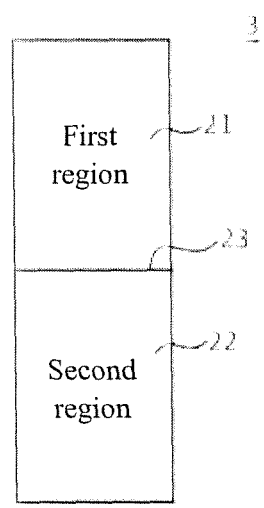
FIG. 28 is a diagram illustrating an example of a configuration of the deflecting element according to one embodiment of the present invention.

As illustrated in FIG. 26 and FIG. 28, the deflecting element 3 has a first region that guides the laser light emitted from the first emission point 110 to the biaxial MEMS mirror 4 (first diffracting portion 21) and a second region that guides the laser light emitted from the second emission point 120 to the biaxial MEMS mirror 4 (second diffraction portion 22). The boundary surface 23 is provided between the first region and the second region.

Note that a portion of the laser light emitted from the second emission point 120 becomes incident to the first region, but this portion of the laser light is deflected by the first region and does not arrive at the biaxial MEMS mirror 4. Similarly, a portion of the laser light emitted from the first emission point 110 becomes incident to the second region, but this portion of the laser light is deflected by the second region and does not arrive at the biaxial MEMS mirror 4.

In these examples, the polarization plane of the deflecting element 3 is disposed in a position where the respective luminous fluxes of the laser lights that are emitted from the two emission points and pass through the collimating lens 2 overlap or a position closer than this position. At this time, a distance L between the deflecting element 3 and the collimating lens 2 becomes not more than a predetermined distance sought by formula (3) below.

$$\text{Predetermined distance } L1 = D1/\tan(\theta 1/2) \tag{3}$$

Here,

D1: value half a distance between the first emission point 110 and the second emission point 120, and $\theta 1$: spreading angle of the luminous fluxes of the laser lights emitted from the first emission point 110 and the second emission point 120.

D1 and $\theta 1$ are values established dependent on a structure of the laser chip. Here, D1, which indicates a half value of an interval between the emission points, is preferably a small value to decrease the deflection angle by the deflecting element. However, when the value of D1 is too small, a laser output decreases due to thermal interference between the emission points, components interfere with each other by a distance between the laser light source unit 1 and the deflecting element 3 becoming too close, and an allowable positional precision between the laser light source unit 1 and the deflecting element 3 becomes strict. Meanwhile, when D1 is too large, the chip of the laser light source becomes large, increasing costs; a package of the chip becomes large, increasing a size of a product; and the deflection angle becomes large, generating an aberration and worsening rendering quality.

Furthermore, when the value of $\theta 1$, which is the spreading angle of the luminous fluxes of the laser lights, is too small, a rendering spot size becomes large, decreasing a rendering resolution; a luminous flux diameter becomes too small, increasing a light intensity density; and a demanded light resistance performance of optical components becomes strict. Meanwhile, when the value of $\theta 1$ is too large, a usage efficiency of light worsens, decreasing brightness; the distance between the laser light source unit 1 and the deflecting element 3 becomes too close, causing interference in these components; and sizes of the optical components become large, increasing the size of the product.

In consideration of these conditions, for example, the value of D1 can be made to be 30 μm to 150 μm or 45 μm to 150 μm and the value of $\theta 1$ can be made to be 5 degrees to 40 degrees. For example, when $\theta 1$ is made to be 20 degrees and the value of D1 is made to be 55 μm, the value of L1 becomes substantially 0.3 mm. Note that the value indicated here is but one example, and any value that satisfies the formula given above can be used as a design value.

Figure 29:
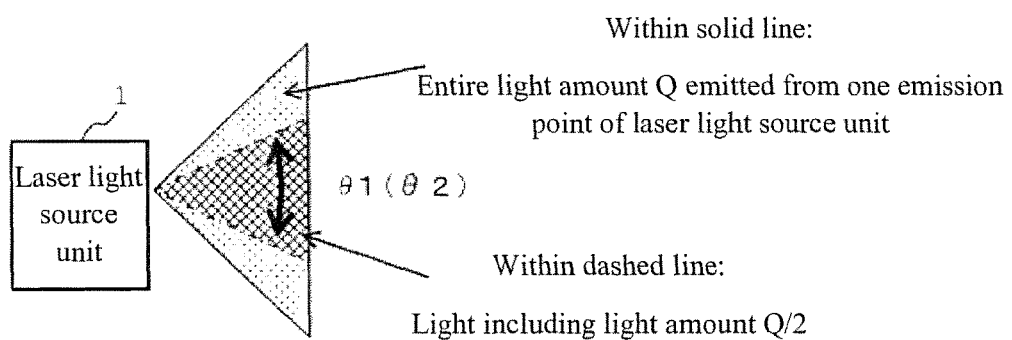
FIG. 29 is a diagram describing a spreading angle of a laser light emitted by a laser light source unit according to one embodiment of the present invention.

Note that as illustrated in FIG. 29, the spreading angle θ1 of the luminous fluxes is an angle greater than a spreading angle of a laser light including a light amount of Q/2 that is half a total light amount Q of the laser light emitted from the first emission point 110 or the second emission point 120.

FIG. 27 represents a physical positional relationship of components in a configuration where the collimating lens 2 is disposed between the laser light source unit 1 and the deflecting element 3 as illustrated in the first example, the second example, and the like described above.

As illustrated in FIG. 27 and FIG. 28, the deflecting element 3 has a first region that guides the laser light emitted from the second emission point 120 to the biaxial MEMS mirror 4 (first diffracting portion 21) and a second region that guides the laser light emitted from the first emission point 110 to the biaxial MEMS mirror 4 (second diffraction portion 22). The boundary surface 23 is provided between the first region and the second region.

Note that a portion of the laser light emitted from the first emission point 110 becomes incident to the first region, but this portion of the laser light is deflected by the first region and does not arrive at the biaxial MEMS mirror 4. Similarly, a portion of the laser light emitted from the second emission point 120 becomes incident to the second region, but this portion of the laser light is deflected by the second region and does not arrive at the biaxial MEMS mirror 4.

In these examples, the deflecting surface of the deflecting element 3 is disposed in a position where the respective luminous fluxes of the laser lights that are emitted from the two emission points and pass through the collimating lens 2 overlap or a position farther than this position. At this time, the distance L between the deflecting element 3 and the collimating lens 2 becomes not less than a predetermined distance sought by formula (4) below.

$$\text{Predetermined distance } L2 = f2 \cdot \sin(\theta2/2)/D2 \quad (4)$$

Here, f: distance between the laser light source unit 1 and the collimating lens 2 (focal length of collimating lens 2), θ2: spreading angle of the luminous fluxes of the laser lights emitted from the first emission point and the second emission point of the laser light source unit 1, and D2: value half the distance between the first emission point and the second emission point.

D2 and θ2 are values established dependent on the structure of the laser chip. Here, D2, which indicates a half value of the interval between the emission points, is preferably a small value to decrease the deflection angle by the deflecting element. However, when the value of D2 is too small, a laser output decreases due to thermal interference between the emission points; the distance between the collimating lens 2 and the deflecting element 3 becomes long, increasing a size of a product and decreasing an axis misalignment tolerance; and an allowed positional precision between the laser light source unit 1 and the collimating lens 2 becomes strict. Meanwhile, when D2 is too large, the chip of the laser light source becomes large, increasing costs; the package of the chip becomes large, increasing the size of the product; and the deflection angle becomes large, generating an aberration and worsening rendering quality.

Furthermore, when the value of θ2, which is the spreading angle of the luminous fluxes of the laser lights, is too small, a rendering spot size becomes large, decreasing a rendering resolution; a luminous flux diameter becomes too small, increasing a light intensity density; and a demanded light resistance performance of optical components becomes strict. Meanwhile, when the value of θ2 is too large, a usage efficiency of light worsens, decreasing brightness; the distance between the collimating lens 2 and the deflecting element 3 becomes too long, increasing the size of the product and decreasing the axis misalignment tolerance; and sizes of the optical components become large, increasing the size of the product.

In consideration of these conditions, for example, the value of D2 can be made to be 30 μm to 150 μm or 45 μm to 150 μm and the value of θ2 can be made to be 5 degrees to 40 degrees. Moreover, in consideration of a tradeoff between an incorporation efficiency of the laser lights emitted from the emission points and a risk of optical axis misalignment with regard to positional misalignment, the value of f can be made to be 2 to 3 mm. For example, when θ1 is made to be 20 degrees, D2 is made to be 55 μm, and f is made to be 2.2 mm, the value of L2 becomes substantially 15.3 mm. Note that the value indicated here is but one example, and any value that satisfies the formula given above can be used as a design value.

Note that as illustrated in FIG. 29, the spreading angle θ2 of the luminous fluxes is an angle greater than the spreading angle of the laser light including the light amount of Q/2 that is half the total light amount Q of the laser light emitted from the first emission point 110 or the second emission point 120.

INDUSTRIAL APPLICABILITY

The present invention is useful in obtaining a synthetic light that has a single polarization plane and has an increased light-emission intensity from laser lights emitted from a plurality of emission points in a laser optical device that emits a laser light.

REFERENCE SIGNS LIST

1 Laser light source unit (laser-light-emitting element, laser generation unit)
2, 8, 9, 61, 62 Collimating lens
3, 30, 40 Deflecting element
4 Biaxial MEMS mirror
5 Screen
6 Blue laser light source unit
7 Green laser light source unit
10, 11 Dichroic prism
12 Position adjustment mechanism
13 Head-up display
15 Projector according to present invention
18 Combiner
21A First diffracting surface (deflecting surface)
21C Groove portion (first diffracting groove portion)
22A Second diffracting surface (deflecting surface)
22C Groove portion (second diffracting groove portion)
31A First refracting surface (deflecting surface)
32A Second refracting surface (deflecting surface)
41A First reflecting surface
42A Second reflecting surface
70 Control IC (control unit)
100 Image projection device
110 First emission point
120 Second emission point
200 Laser optical device
C1 Laser chip M1 Mirror
P1 Prism
B11 First laser light
S11a First emitted luminous flux
L11a First optical axis
B12 Second laser light
S12a Second emitted luminous flux
L12a Second optical axis

The invention claimed is:

1. A laser optical device, comprising:
a laser light source unit that emits a first laser light from a first emission point and emits a second laser light from a second emission point different from the first emission point;
a deflecting element that receives the first laser light and the second laser light, deflects at least one among luminous fluxes of the first laser light and the second laser light, and emits the luminous fluxes as a first emitted luminous flux and a second emitted luminous flux; and
a collimating lens that makes the first emitted luminous flux and the second emitted luminous flux emitted from the deflecting element into parallel luminous fluxes; wherein
the deflecting element deflects the at least one among the luminous fluxes of the first laser light and the second laser light so an angle formed between optical axes of the first emitted luminous flux and the second emitted luminous flux spreads wider than an angle formed between optical axes of the first laser light and the second laser light and a virtual image of a light source of the first emitted luminous flux and a virtual image of a light source of the second emitted luminous flux overlap, and
the deflecting element is disposed so a distance between the deflecting element and the collimating lens is not more than a predetermined distance sought by formula (1) below, Predetermined distance $L1 = D1/\tan(\theta1/2)$ (1)

Here,
D1: value half a distance between the first emission point and the second emission point, and
θ1: spreading angle of the luminous fluxes.

2. The laser optical device according to claim 1, wherein the deflecting element has a deflecting surface that deflects at least one among the luminous fluxes of the first laser light and the second laser light, and
the deflecting surface is disposed in a position closer to the laser light source unit than a position where the luminous flux of the first laser light and the luminous flux of the second laser light overlap.

3. The laser optical device according to claim 1, wherein the first emission point and the second emission point are provided on the same laser-light-emitting element.

4. The laser optical device according to claim 1, wherein the deflecting element is of a transmissive type and has a deflecting surface that deflects at least one among the luminous fluxes of the first laser light and the second laser light, and
the deflecting surface is provided on a light-incidence-surface side to which the first laser light and the second laser light become incident.

5. The laser optical device according to claim 1, wherein the deflecting element is a diffractive optical element having a first diffracting surface that diffracts the luminous flux of the first laser light and a second diffracting surface that diffracts the luminous flux of the second laser light,
the first diffracting surface is formed at a pitch according to a wavelength of the first laser light in a first direction that is a direction in which the first laser light and the second laser light are deflected and has a first diffracting groove portion consisting of a plurality of diffracting grooves extending along a second direction orthogonal to the first direction, and
the second diffracting surface is formed at a pitch according to a wavelength of the second laser light in the first direction and has a second diffracting groove portion consisting of a plurality of diffracting grooves extending along the second direction.

6. The laser optical device according to claim 5, wherein the plurality of diffracting grooves in at least one among the first diffracting groove portion and the second diffracting groove portion is configured so the pitch varies at different positions in the first direction.

7. The laser optical device according to claim 5, wherein the plurality of diffracting grooves in the at least one among the first diffracting groove portion and the second diffracting groove portion includes a diffracting groove whose groove width changes gradually in the second direction.

8. The laser optical device according to claim 1, wherein the deflecting element is a refractive optical element having a first refracting surface that refracts the luminous flux of the first laser light and a second refracting surface that diffracts the luminous flux of the second laser light.

9. The laser optical device according to claim 8, wherein D1 is 30 μm to 150 μm and θ1 is 5 degrees to 40 degrees.

10. The laser optical device according to claim 1, wherein the deflecting element is a reflective optical element having a first reflective surface that reflects the luminous flux of the first laser light and emits the luminous flux as the first emitted luminous flux and a second reflective surface that reflects the luminous flux of the second laser light and emits the luminous flux as the second emitted luminous flux.

11. The laser optical device according to claim 1, wherein the spreading angle of the luminous fluxes of the laser lights is an angle greater than a spreading angle of a laser light including a light amount half a total light amount of the laser light emitted from the first emission point or the second emission point.

12. The laser optical device according to claim 1, wherein the deflecting element has
a first region that guides the laser light emitted from the first emission point to a scanning mirror and
a second region that guides the laser light emitted from the second emission point to the scanning mirror, and
the first region and the second region are separated by one boundary line.

13. An image projection device, comprising:
the laser optical device according to claim 1; and
a scanning mirror that projects an image by two-dimensionally deflecting and scanning a laser light emitted from the collimating lens.

14. The image projection device according to claim 13, further comprising:
a control unit that receives image data to be projected by the image projection device and controls a timing of emitting the first laser light, which corresponds to the image data, and the second laser light, which corresponds to the image data; wherein
one among scanning directions of the scanning mirror is aligned in a direction in which the laser optical device deflects at least one among the luminous fluxes of the first laser light and the second laser light.

15. A laser optical device, comprising:
a laser light source unit that emits a first laser light from a first emission point and emits a second laser light from a second emission point different from the first emission point;
a collimating lens that makes the first laser light and the second laser light parallel luminous fluxes; and
a deflecting element that deflects at least one among the first laser light and the second laser light emitted from the collimating lens; wherein
the deflecting element is disposed so a distance between the deflecting element and the collimating lens is not less than a predetermined distance sought by formula (2) below, $$\text{Predetermined distance } L2 = f^2 \cdot \sin(\theta 2/2)/D2 \quad (2)$$

Here,
f: distance between the laser light source unit and the collimating lens,
θ2: spreading angle of the luminous fluxes of the first laser light and the second laser light, and
D2: value half a distance between the first emission point and the second emission point.

16. The laser optical device according to claim 15, wherein
the deflecting element has a deflecting surface that deflects at least one among the luminous fluxes of the first laser light and the second laser light emitted from the collimating lens, and
the deflecting surface is disposed in a position farther from the laser light source unit than a position where the luminous flux of the first laser light and the luminous flux of the second laser light overlap.

17. The laser optical device according to claim 15, wherein the spreading angle of the luminous fluxes of the laser lights is an angle greater than a spreading angle of a laser light including a light amount half a total light amount of the laser light emitted from the first emission point or the second emission point.

18. The laser optical device according to claim 15, wherein
the deflecting element has
a first region that guides the laser light emitted from the first emission point to a scanning mirror and
a second region that guides the laser light emitted from the second emission point to the scanning mirror, and
the first region and the second region are separated by one boundary line.

19. The laser optical device according to claim 15, wherein D2 is 30 μm to 150 μm and θ2 is 5 degrees to 40 degrees.

20. The laser optical device according to claim 15, wherein the deflecting element deflects at least one of a plurality of lights with mutually-different emission directions emitted from the collimating lens at a deflection angle greater than a situation of deflecting at least one of the plurality of lights with mutually-different emission directions emitted from the collimating lens in a direction along an optical axis.

* * * * *